United States Patent [19]

Peterson

[11] 4,384,817
[45] May 24, 1983

[54] VEHICLE LIFT FOR A WRECKER TRUCK

[76] Inventor: Frank H. Peterson, 8330 Atlantic Blvd., Jacksonville, Fla. 32211

[21] Appl. No.: 274,784

[22] Filed: Jun. 18, 1981

[51] Int. Cl.³ .............................................. B60P 3/12
[52] U.S. Cl. ..................................... 414/563; 280/402
[58] Field of Search ......................... 414/563; 280/402

[56] References Cited

U.S. PATENT DOCUMENTS

| | | |
|---|---|---|
| 3,310,186 | 3/1967 | Wegener et al. |
| 3,434,607 | 3/1969 | Nelson |
| 3,434,608 | 3/1969 | Nelson |
| 3,490,627 | 1/1970 | Goldston, Jr. |
| 3,599,811 | 8/1971 | Watkins |
| 3,620,393 | 11/1971 | Bubik |
| 3,627,154 | 12/1971 | Troup |
| 3,667,630 | 6/1972 | Scott |
| 3,690,482 | 9/1972 | Gaumont |
| 3,721,356 | 3/1973 | McNeill |
| 3,747,783 | 7/1973 | Long |
| 3,825,132 | 7/1974 | Colangelo |
| 3,841,506 | 10/1974 | Smith |
| 3,897,879 | 8/1975 | Bubik |
| 3,924,763 | 12/1975 | Pigeon |
| 4,010,858 | 3/1977 | Mahnke, Jr. |
| 4,034,873 | 7/1977 | Haring |
| 4,103,799 | 8/1978 | Perez |

OTHER PUBLICATIONS

EKA Recovery Systems -NO404 Series, 4 page Brochure, EKA Wrecker U.S.A.; 99 Serramonte Blvd., Colma, Ca. 94014.
Hide-A-Way Lift, 2 page Brochure, Weld/Build Body Co., Inc., 276 Long Island Ave., Wyandanch, N.Y. 11798.
Holmes Wrecker and Towing Equipment, 2 page Brochure, Ernest Holmes Company, Chattanooga, Tn.

Primary Examiner—Robert G. Sheridan
Attorney, Agent, or Firm—Arthur G. Yeager

[57] ABSTRACT

A vehicle towing apparatus includes right and left vehicle lifts releasably locked and pivoted to a pivot member and movable between a storage position alongside the low beam of the boom. The boom and/or the low beam may be hydraulically actuated or mechanically actuated by a power winch, cable and derrick boom. A sling is provided suitably mounted for pivotal movement adjacent the rear end of the low beam. A mechanical support, including a fixed and a movable member, engages the boom to adjust the height thereof between lower loading and upper towing positions. The mechanical support is affixed to the vehicle frame and is independent of the hydraulic or mechanical actuation of the boom and/or low beam to permit unloading of same.

35 Claims, 15 Drawing Figures

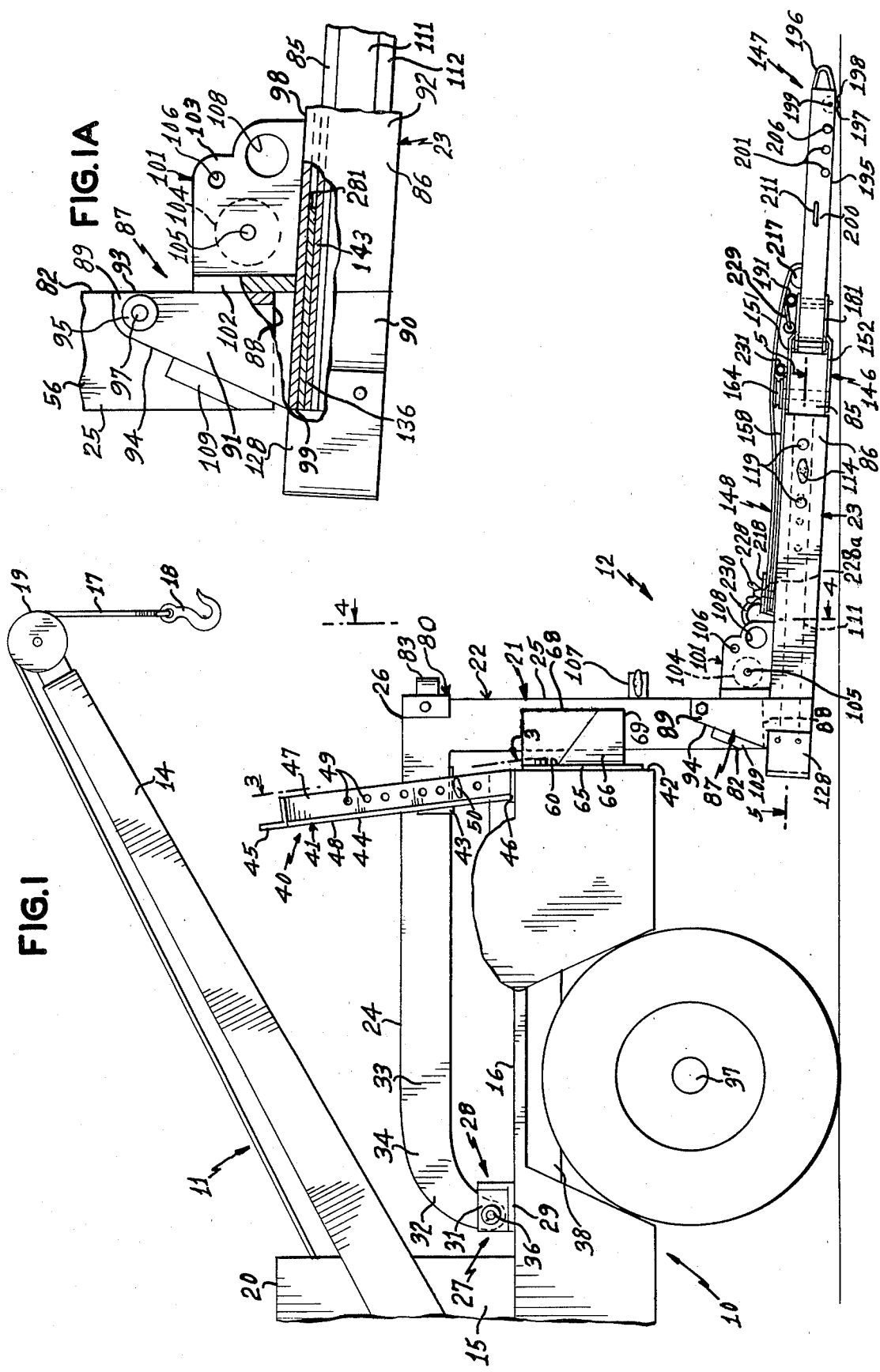

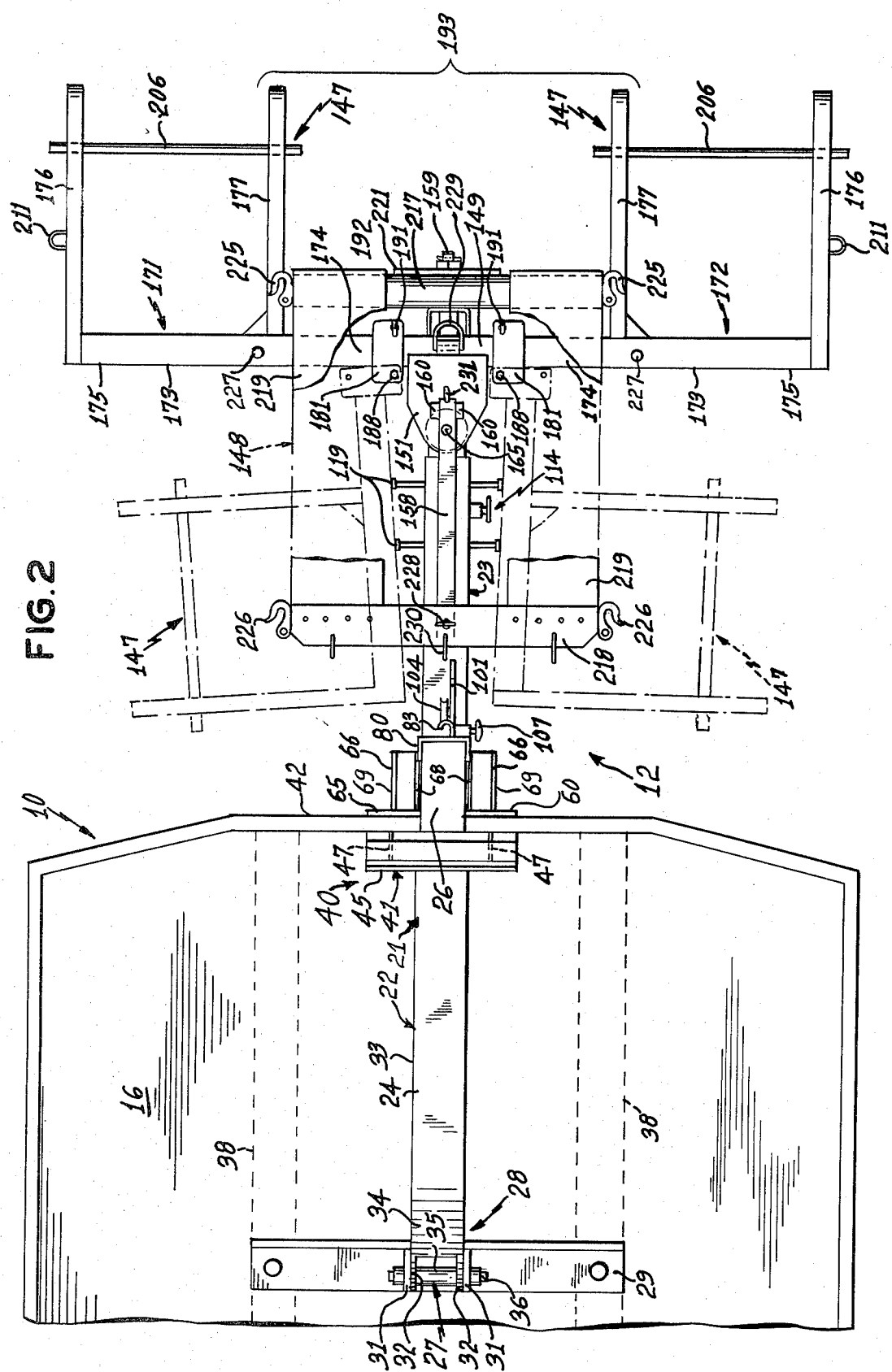

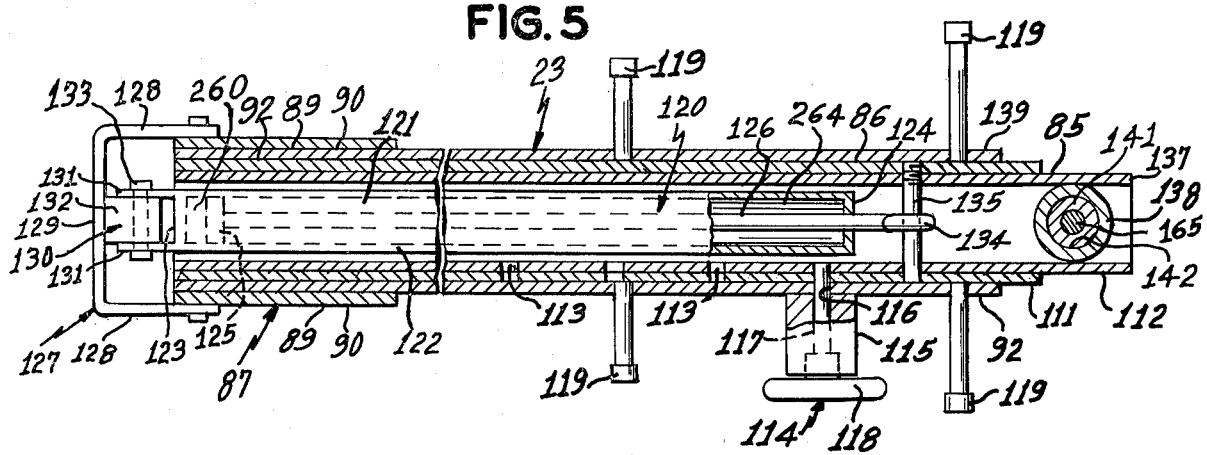
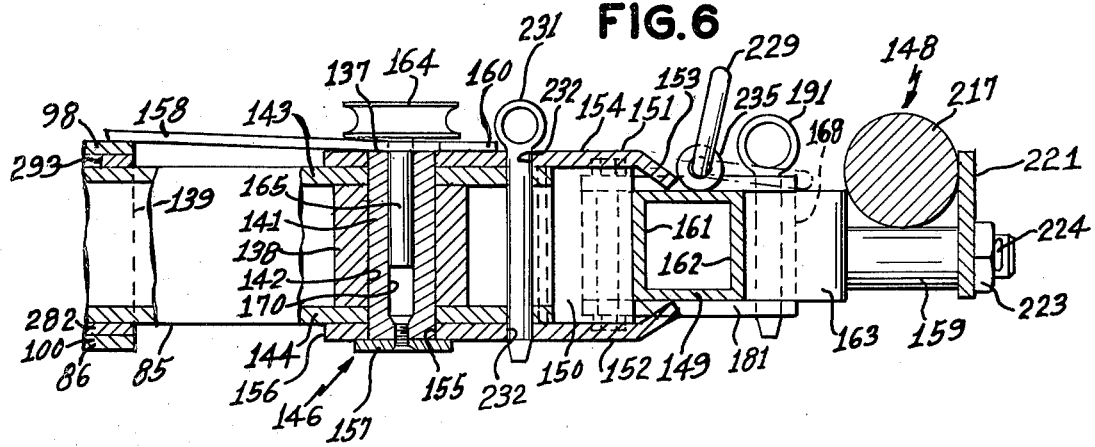
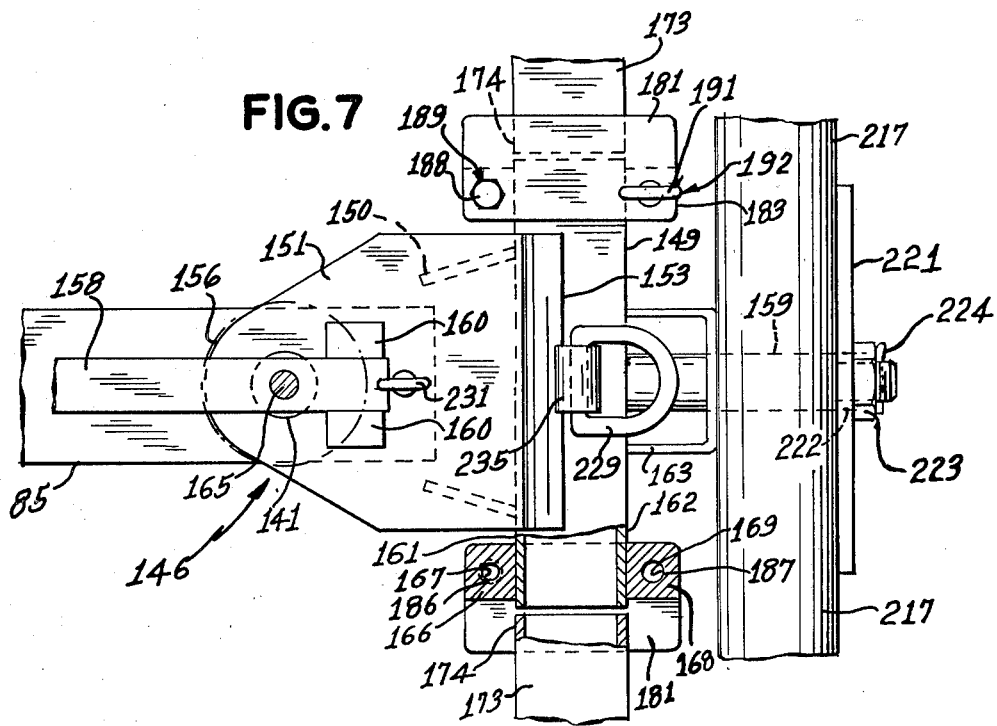

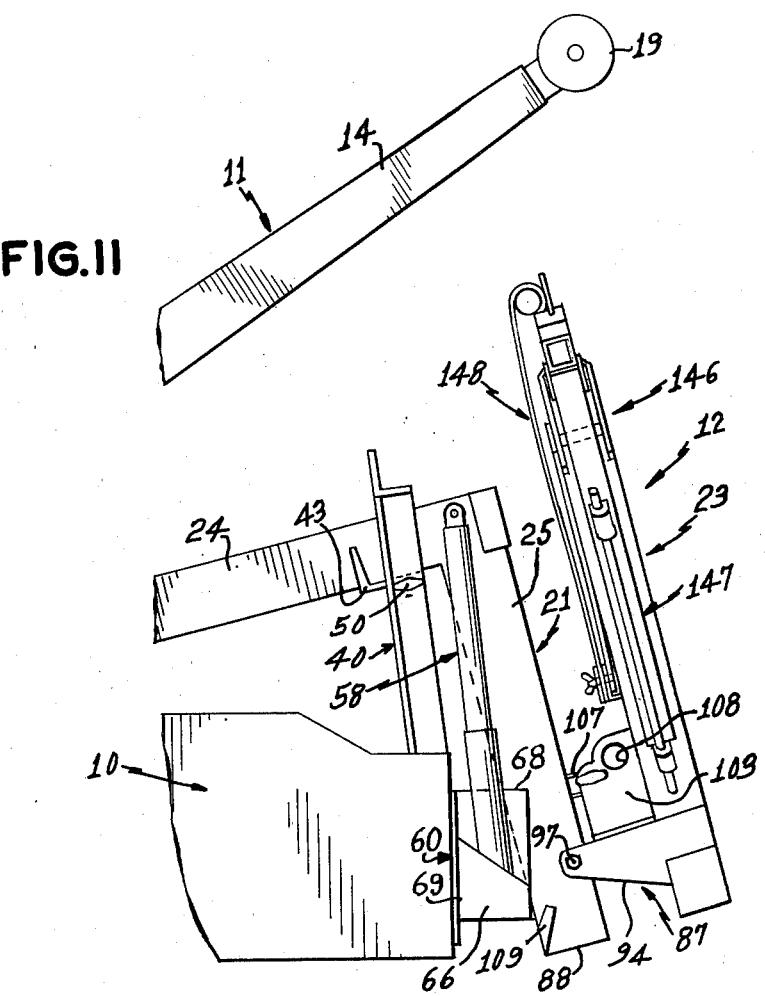
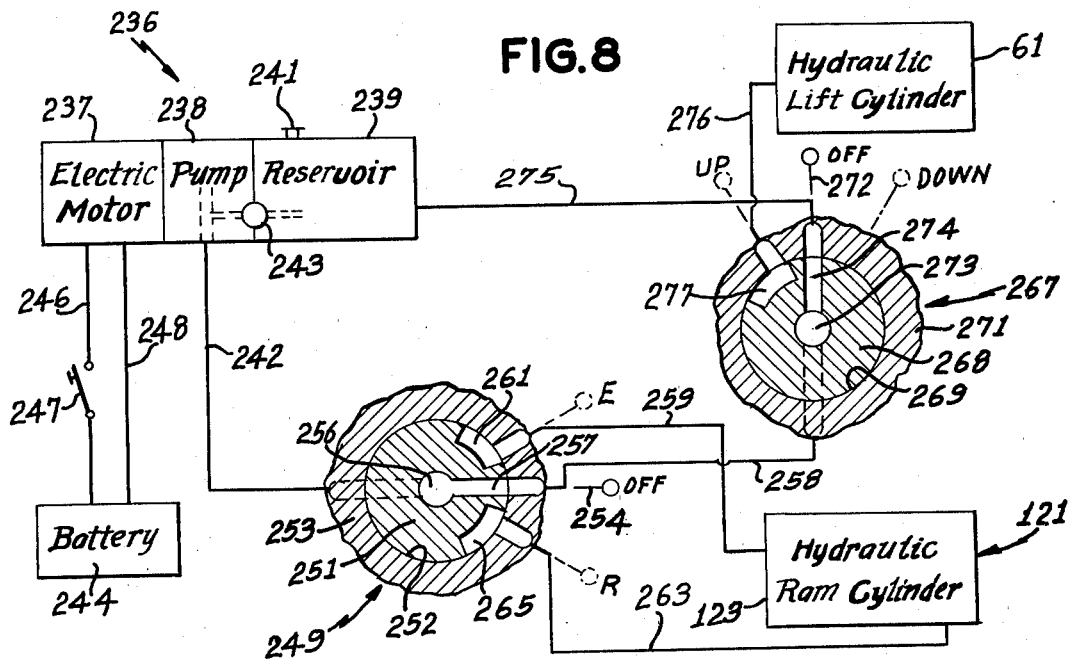

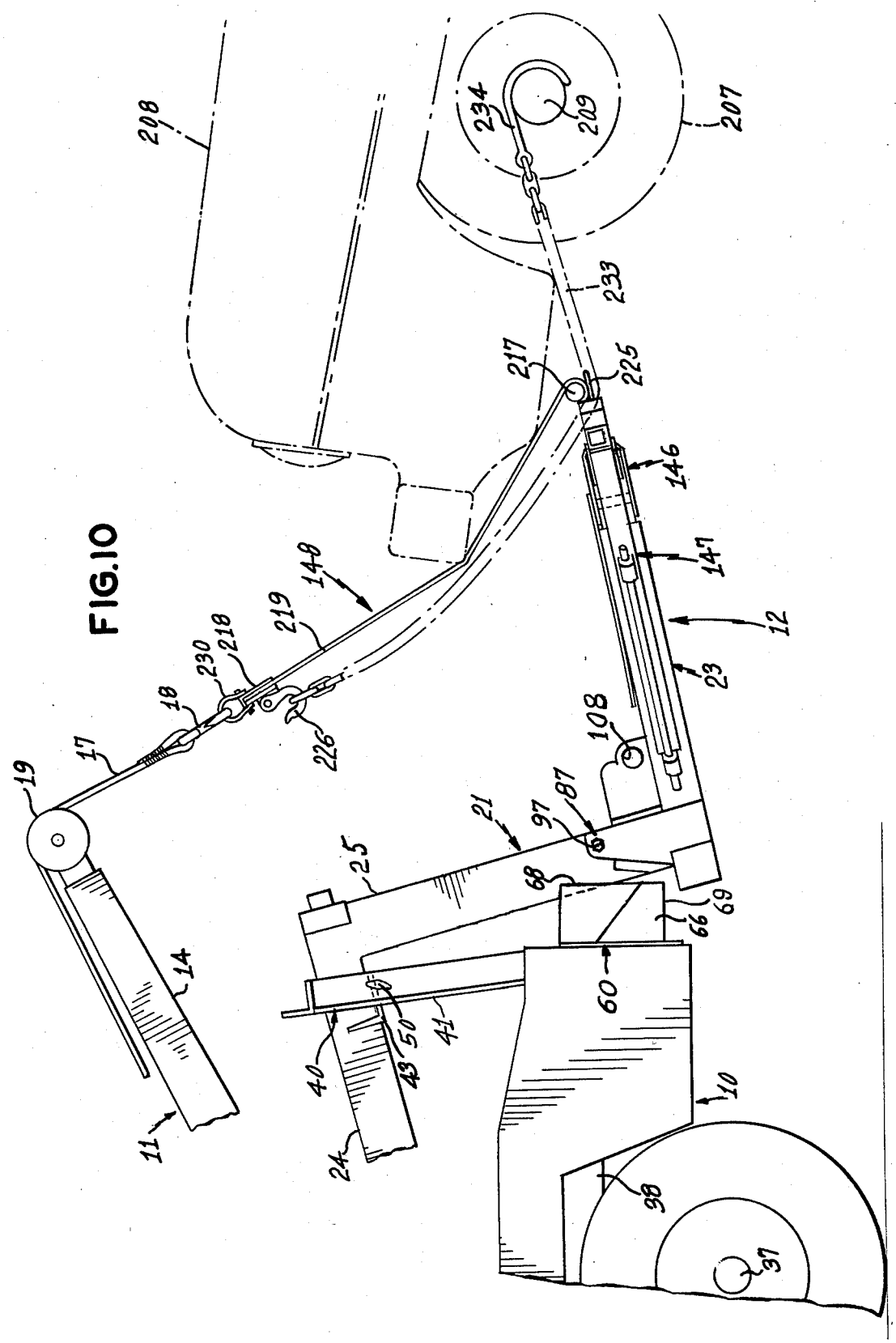

VEHICLE LIFT FOR A WRECKER TRUCK

SUMMARY OF INVENTION

My invention relates to wrecker trucks with a derrick and a vehicle lift and more particularly to vehicle lifts having wheel lift and sling lift apparatus.

My invention provides a wrecker truck with an improved vehicle lift that can be folded into a compact storage position so the wrecker truck has good roadability and the wrecker truck may be used for pulling, lifting, and towing vehicles that can be handled by attaching the hook of the derrick cable to the bumper or frame of the vehicle. The vehicle lift can be partially unfolded to use the sling lift apparatus including a sling mounted thereon and operatively attached for lifting and towing vehicles requiring a sling for handling by engaging the underbody. The vehicle lift may be fully unfolded and the wheel forks placed under the front or rear wheels of a vehicle for lifting and towing of vehicles requiring handling by engaging an opposed pair of wheels.

My vehicle lift provides wheel lift apparatus having a lift boom supporting wheel forks that may be moved by the wrecker truck to a position for lifting the vehicle wheels. The wheel forks may be placed in various angular positions relative to the lift boom, so the wrecker truck may be at an angle to the disabled vehicle for lifting and oscillate for towing. The lift boom has tow cable guide means to guide the cable horizontally to pull a disabled vehicle onto the wheel forks from any rearward, straight or angular direction. Thus, a known wrecker truck with a derrick and my improved vehicle lift with wheel forks and attached sling may be used for lifting and towing vehicles, which inherently or due to damage, have frame lift, body sling lift and wheel lift handling requirements and may retrieve a vehicle aligned with or at an angle to the wrecker truck in the proper manner to avoid further damage to the vehicle during retrieval.

My improved vehicle lift has a lift boom with upper and lower boom portions. The upper boom portion has a horizontal beam and a vertical beam. The horizontal beam is pivotally mounted at its forward end for pivotal movement about a horizontal transverse axis by a mounting hinge secured centrally to the wrecker truck platform, extends rearwardly and is secured at its rear end to a vertical beam extending downwardly adjacent to the back plate of the wrecker truck. The lower boom portion is connected by a boom hinge to the lower end of the vertical boom for limited pivotal movement about a horizontal transverse axis between a vertical storage position and a horizontal and rearward extending loading position. The lift boom pivots on the mounting hinge and is held in alignment by the boom hinge and a guide on the back of the wrecker truck centrally engaging the vertical beam for movement only in a vertical plane from a lower loading position to upper towing and storage positions. An adjustable height mechanical boom support employs a support member or pin adjustably mounted on a frame or the guide to support the lift boom in such positions. The lower boom portion has a ram telescopically supported by pad bearings in a guide portion for relative axial movement to vary the length of the lower boom portion and a ram lock to hold the ram in various length positions.

A pivot assembly is pivotally mounted for pivotal movement about a vertical pivot axis in loading position to the rear end of the ram extending rearwardly beyond the guide portion. Locking means may be used to hold the pivot assembly aligned with and in selected angular positions relative to the ram and lower boom portion. A wheel fork is pivotally mounted for pivotal movement about a vertical hinge axis on each side of the pivot assembly from a loading position to a storage position and has locking means to hold the wheel forks in fixed relation to the pivot assembly in loading position to provide a pair of forks parallel to each other and spaced apart to engage under and lift a pair of wheels at one end of a vehicle. Each fork has a base bar and a pair of rearwardly extending parallel tines adapted to be positioned on each side of the vehicle wheels. A skid and a roller wheel on the distal end of the tines aids movement of the wheel forks along side and under vehicle wheels. Each wheel fork has a support rod mounted on the tines in one of several positions parallel to and adjustably spaced from the base bar to lift various size wheels. The rods are rotatably mounted on the tines for rolling entry under a vehicle wheel and removable for movement of the tines alongside a vehicle wheel and then remounted on the tines so the base bar and rod cradle engage the vehicle wheel for lifting. There is a distance of about one half the overall width of the lower boom portion from the vertical pivot axis to the base bars so the pivot assembly and wheel forks may pivot from a transverse position about or nearly ninety degrees to the right or left and from the vertical pivot axis laterally to the vertical hinge axis so the wheel forks can swing to a storage position alongside the lower boom portion.

The sling has a bottom bar centrally pivotally mounted for pivotal movement about a horizontal axis axially aligned with the lower boom portion at the rear side of the pivot assembly and a top bar, which in sling storage position is secured to a support bar fixed to and oscillating with the pivot assembly and extending horizontally forward over the lower boom portion, so the sling does not interfere with the operation of the wheel lift apparatus.

When the wrecker truck travels to a disabled vehicle my vehicle lift is in storage position with the lift boom resting on an adjustable mechanical boom support in an upper position for normal road clearance, the lower boom portion is retracted and folded on the boom hinge to a vertical position adjacent the vertical beam. The height and rear overhang is substantially the same as the derrick boom. The wheel forks are normally in folded storage position alongside the lower boom to reduce the height but may be locked in loading position. The sling is secured in storage position on the lower boom portion. In the preferred mechanical embodiment, to move the vehicle lift from storage position to loading position, the ram and lower boom are unlocked, the wrecker cable is used to lift the ram and attached pivot assembly and wheel forks to the fully extended position of the lower boom portion and the ram is relocked. Then the wrecker cable is used to lower the lower boom portion to loading position. The wrecker cable is also used to remove the adjustable boom support and lower the lift boom to loading position. In a hydraulic modification lift and ram power actuators, such as hydraulic cylinders, are used respectively to lift and lower the lift boom and to extend and retract the ram.

With the lift boom in loading position and the wheel forks locked in loading position, front cable guide means, a pulley, at the boom hinge pivoted end of the lower boom portion and near cable guide means, a pulley, on the vertical pivot axis of the pivot assembly will guide a cable or chain above and lengthwise of the lower boom portion and then at any rearward angle to a disabled vehicle. With the wheel forks set at a similar angle, the vehicle may be pulled by the cable for loading from a wide range of rearward angles on the wheel forks without the cable exerting a turning moment on the wheel forks. For loading a vehicle substantially at a right angle the wheel forks are placed in the right or the left maximum angular position with the base bar nearly aligned with the lower boom portion and the rear cable guide means is placed on the inward portion of the respective right or left base bar so the pull on the cable will provide a turning moment to maintain the wheel forks in the right or left maximum angular position during loading. When the wrecker truck can be backed up to the disabled vehicle, the wrecker truck is backed or a ram power actuator is used to move the wheel forks alongside or under the vehicle wheels for loading. When the vehicle is loaded on the wheel forks, the wrecker cable or lift power actuator is used to lift the lift boom and vehicle to towing height and the mechanical boom support is engaged to support the lift boom at towing height. The wrecker cable or the ram power actuator is then used to retract the ram to provide the proper length of the lower boom portion to provide the desired vehicle to wrecker truck clearance for turning during towing. When it is desired to use the sling, the wheel forks are unlocked and folded back alongside the lower boom portion so they do not interfere with sling operation. The top bar of the sling is unfastened from the support bar. The bottom bar of the sling remains pivotally mounted on the pivot assembly. The wrecker cable and/or power actuators are used to position the lower boom portion and the bottom sling bar and in conjunction with cable lifting of the top bar, sling hooks attached to the vehicle axle and the wrecker cable or lift power actuator for raising the sling and lift boom, the vehicle is lifted on the sling to towing position for towing.

In order to move the lift boom to storage position, the sling is fastened in storage position, the ram is unlocked and the wrecker cable or the ram power actuator is used to retract the ram to reduce the length of the lower boom portion to its minimum length and locked, the wheel forks are unlocked and folded to partial storage position alongside the lower boom portion, the cable is used to lift the lower boom portion to a folded storage position adjacent to the vertical boom portion and locked and the lift boom is lifted by the wrecker cable or the lift power actuator and mechanically supported in maximum height position.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a partial elevational view of the wrecker truck with the derrick and the vehicle lift assembly in the wheel lift loading position, with parts broken away to show details;

FIG. 1A is a partial enlargement of FIG. 1 with part in section to show details of the boom hinge and pad bearing;

FIG. 2 is a partial plan view of the wrecker truck without the derrick to show the vehicle lift assembly in wheel lift loading position in solid lines and the wheel forks in storage position in dot-dash lines for sling lift.

FIG. 5 is a partial enlarged sectional view showing the lower boom portion of FIG. 1 with the added ram hydraulic assembly of the modification;

FIG. 6 is a partial enlarged elevational view of the pivot assembly and connected members with parts broken away and in section;

FIG. 7 is a partial enlarged plan view of the pivot assembly and connected members with parts broken away and in section;

FIG. 8 is a schematic view of the hydraulic power system of the modification;

FIG. 10 is a partial elevational view of the vehicle lift assembly and sling supporting a vehicle in towing position;

FIG. 11 is a partial elevational outline view showing the vehicle lift and sling in storage position and showing the added power lift assembly of the modification;

DETAILED DESCRIPTION OF THE INVENTION

Figure 4:
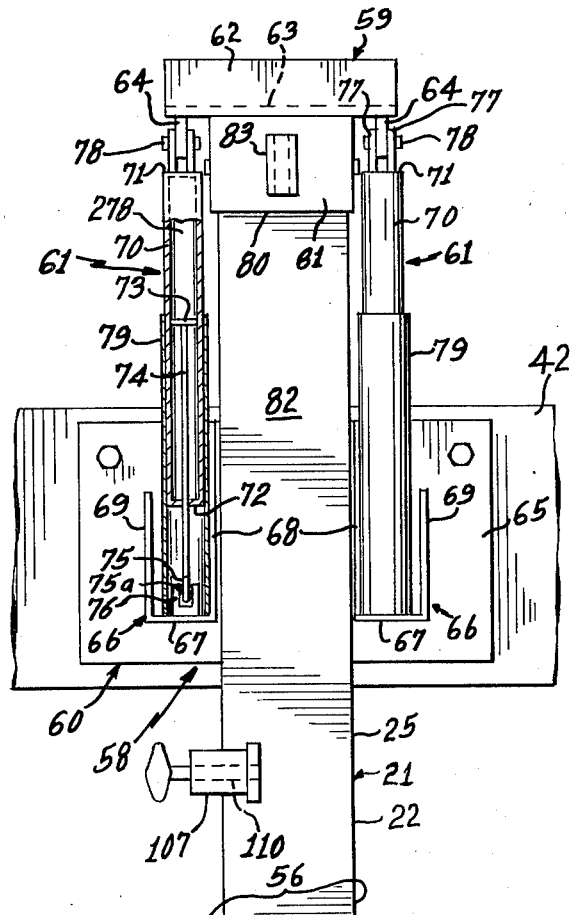
FIG. 4 is a partial enlarged sectional view on line 4—4 of FIG. 1 showing the lift boom with the added power lift and ram hydraulic assemblies of a modification.
Figure 3:
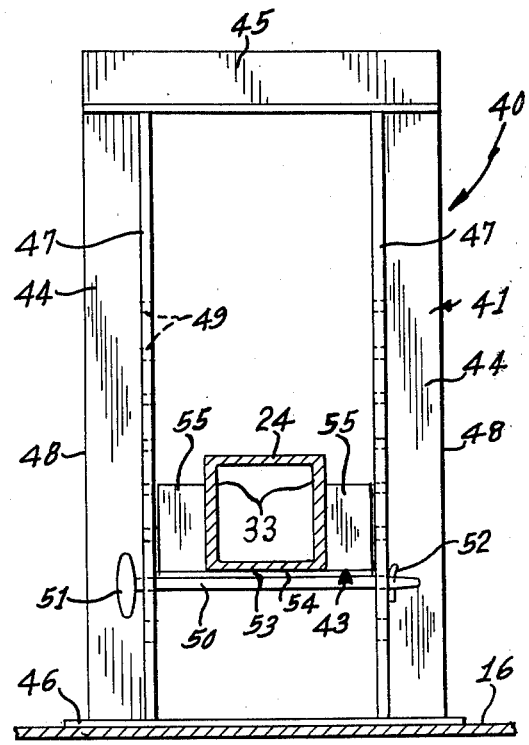
FIG. 3 is a partial enlarged sectional view on line 3—3 of FIG. 1 showing the boom support assembly.
Figure 4A:
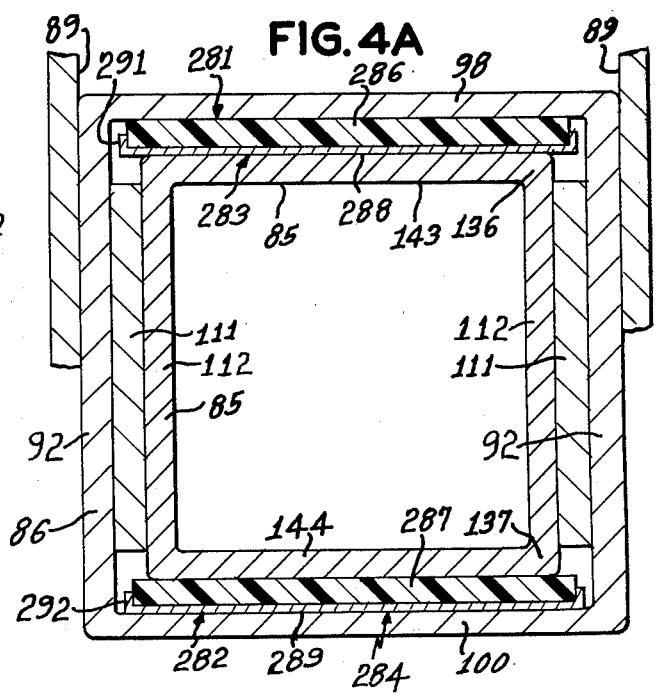
FIG. 4A is a partial sectional view with parts broken away of the lower boom portion showing both pad bearings.

The preferred mechanical embodiment is shown in FIGS. 1, 1A, 2, 3, 6 and 7 with reference for boom details to FIGS. 4, 4A and 5 and is power operated by wrecker truck 10 and its derrick 11. The hydraulic modification is the same as the preferred embodiment except that as shown in FIGS. 4, and 5 lift amd ram hydraulic cylinder assemblies 58, 120 and the controls of FIG. 8 have been added to provide hydraulic cylinder power actuators, lift cylinder 121 to extend and retract ram 85. Since the modification uses all the parts of the preferred embodiment in the same arrangement, the same references numbers have been used in the description below.

Referring to FIGS. 1 and 2 of the drawing, the preferred embodiment of the invention in vehicle lift and towing apparatus employes a known wrecker truck 10, having a known derrick 11 and an improved vehicle lift assembly 12. The derrick 11 has a derrick boom 14 mounted at its base by fixed or adjustable mounting means 15 on the platform 16 of truck 10. The cable 17 has a hook 18 at its free end and extends over derrick pully 19 mounted on the distal end of derrick boom 14 to a known winch 20 used to reel in cable 17 to raise hook 18, reel out cable 17 to lower hook 18 or to hold cable 17 and hook 18 in a fixed position.

The vehicle lift assembly 12 has a lift boom 21 having an upper boom portion 22 and a lower boom portion 23. The upper boom portion 22 is an L shaped boom having a horizontal beam 24 and a vertical beam 25 rigidly joined or secured together at the knee 26. These parts and other parts hereafter described as secured to another part are preferably secured by welding but other known means or integral construction may be used where appropriate. These beams and other structural elements are preferably rectangular tubes having a rectangular cross section made by rolling, bending from one plate or fabricating from four plates or other sections and welding all longitudinal seams.

The horizontal beam 24 at the mounting end 34 is connected by a mounting hinge 27 of a boom mounting assembly 28 fixed to platform 16 and frame 38. The boom mounting assembly 28 has a horizontal support member 29, preferably an angle iron, extending transversely substantially the full width of frame 38 and secured, e.g. by bolts, to platform 16 and frame 38 of wrecker truck 10.

The mounting hinge 27 has a pair of pintle sockets 31, each having a cylindrical tube and support secured in spaced relation and centrally to horizontal support member 29 and hinge brackets 32 on horizontal beam 24. The hinge brackets 32 are formed as an integral portion of the side walls 33 at the mounting end 34 of horizontal beam 24 of upper boom portion 22. The pintle eye 35, a cylindrical tube, extends transversely between and through and is secured to the spaced pair of hinge brackets 32. The pintle pin 36 fits in the pintle sockets 31 and pintle eye 35 and is retained therein by known retainer means (not shown). The pintle eye 35 and hinge bracket 32 fit between the spaced pair of pintle sockets 31 to prevent transverse movement of horizontal beam 24 and lift boom 21 during pivotal movement of lift boom 21 about the horizontal axis of pintle pin 36 and mounting hinge 27. The boom mounting assembly 28 is mounted forward of the rear axle 37 and in the portion of platform 16 of wrecker truck 10 that is constructed to support mounting means 15 for derrick boom 14 so this vehicle lift assembly 12 is mounted on known wrecker truck 10 and loads the wrecker truck very similar to the load of derrick 11.

The boom support 40, FIGS. 1, 2 and 3, may engage horizontal beam 24 to mechanically support lift boom 21 in a plurality of vertically adjustable height positions, or be disengaged to permit limited vertical movement by derrick cable 17 or in the modification by power lift assembly 58. The boom support 40 has a support frame 41, an inverted U-shaped frame, supported on platform 16 near the back plate 42 of wrecker truck 10 and an abutment 43 secured to horizontal beam 24. The support frame 41 has a spaced pair of vertical angle irons 44 and a transverse angle iron 45 secured at its ends to the top ends of the pair of vertical angle irons 44. A base plate 46 is secured to the lower ends of vertical angle irons 44 and to platform 16 to support and secure support frame 41 to platform 16. The vertical angle irons 44 are located on opposite sides of horizontal beam 24 and each vertical angle iron 44 has a longitudinal leg 47 in spaced parallel relation to the adjacent side wall 33 and a transverse leg 48 for stiffening extending away from the horizontal beam 24. Each longitudinal leg 47 has a vertical series of spaced support holes 49, FIGS. 1 and 3, transversely aligned to receive a support pin 50 in a series of aligned pairs of support holes at adjustable height positions. The support pin 50, FIG. 3, has a handle 51 at one end and detachable retainer means 52 at the opposite end so when the abutment 43 is not engaging support pin 50, the support pin 50 may be removed and inserted in any aligned pair of support holes below the horizontal beam 24 and abutment 43. The abutment 43 is an angle iron 53 with the horizontal leg 54 extending below horizontal beam 24 and spaced portions of the vertical leg 55 located and secured to the opposite side walls 33 of horizontal beam 24 and fits within support frame 41 with clearance between the ends of angle iron 53 and the longitudinal legs 47 of support frame 41 to permit vertical movement but prevent transverse movement of horizontal beam 24 and lift boom 21. The support frame 41 is tilted forwardly so its top end is forward of the bottom end and the vertical irons 44 are substantially aligned with a tangent to the central portion of the arc of pivotal movement of horizontal beam 24 at abutment angle iron 53 so the support pin 50 in all adjustable height positions centrally engages the horizontal leg 54 of abutment angle iron 53 so support frame 41 is loaded in straight compression without any significant lateral or bending load and clearance is maintained substantially uniform relative to vertical beam 25 and the power lift assembly 58.

In the modification the power lift assembly 58, FIG. 4, has an attaching bracket 59 secured to upper boom portion 22 at the knee 26, a mounting bracket 60 secured to back plate 42 of wrecker truck 10 and a pair of hydraulic lift cylinders 61, located on opposite sides of vertical beam 25. Each hydraulic cylinder 61 is pivotally connected to mounting bracket 60 and to attaching bracket 59. The attaching bracket 59 has an angle iron 62 extending transversely across the top of horizontal beam 24 at knee 26 with the horizontal leg 63 engaging and secured to the top of horizontal beam 24. A pair of apertured ears 64 are secured at opposite ends to the bottom of horizontal leg 63 of angle iron 62, and spaced from the adjacent cable guide base 81 on side walls 33 of horizontal beam 24. The mounting bracket 60 has a plate 65 detachably secured, e.g. by bolts, to the back plate 42 of wrecker truck 10, and a pair of bracket members 66 of U shape with a U-shaped edge engaging and secured to plate 65. The bracket members 66 thus project at a right angle from plate 65 and each has a base 67 extending horizontally, an inner side 68 and an outer side 69. The inner side 68 of each of the pair of bracket members 66 are positioned adjacent to and facing sidewalls 56 of vertical beam 25 with clearance to provide guide means permitting free pivotal movement but preventing transverse or lateral movement of vertical beam 25 and lift boom 21 during movement between and in the loading, towing, and storage positions. The outer sides 69 and inner sides 68 cooperate to support base 67.

The known hydraulic lift cylinders 61, FIG. 4, each have a cylinder 70 with a closed end 71 and an apertured end 72 and a piston 73 which is secured to piston rod 74. Piston 73 is mounted in cylinder 70 and rod 74 passes through apertured end 72 for reciprocating movement. Known piston and rod seals (not shown) are provided. Each piston rod 74 has an attaching eye 75 at the end which is pivotally mounted on a pivot bolt 75a supported on apertured ears 76 secured to base 67 of bracket member 66 to transmit load to mounting bracket 60 on the wrecker truck 10. The closed end 71 of each cylinder 70 has a pair of apertured tongues 77 secured thereto, which fit on opposite sides of an apertured ear 64. A pivot bolt 78 fits through each pair of apertured tongues 77 and their associated apertured ear 64 to pivotally connected cylinder 70 to angle iron 62. Thus attaching bracket 59 provides means to pivotally connect one end of hydraulic cylinders 61 to upper boom portion 22. Mounting bracket 60 and bracket member 66 provide means to pivotally connect and mount the opposite end or rod of hydraulic cylinders 61 on the wrecker truck 10. Thus extending the hydraulic cylinder 61, a type of power actuator means, lifts or raises the upper and lower boom portions 22, 23 of the lift boom 21. A protective dust shield 79, a cylindrical shield made of metal or plastic, is slideably fitted over each cylinder 70 and rests on base 67 to cover piston rod 74 when extended.

Figure 12:
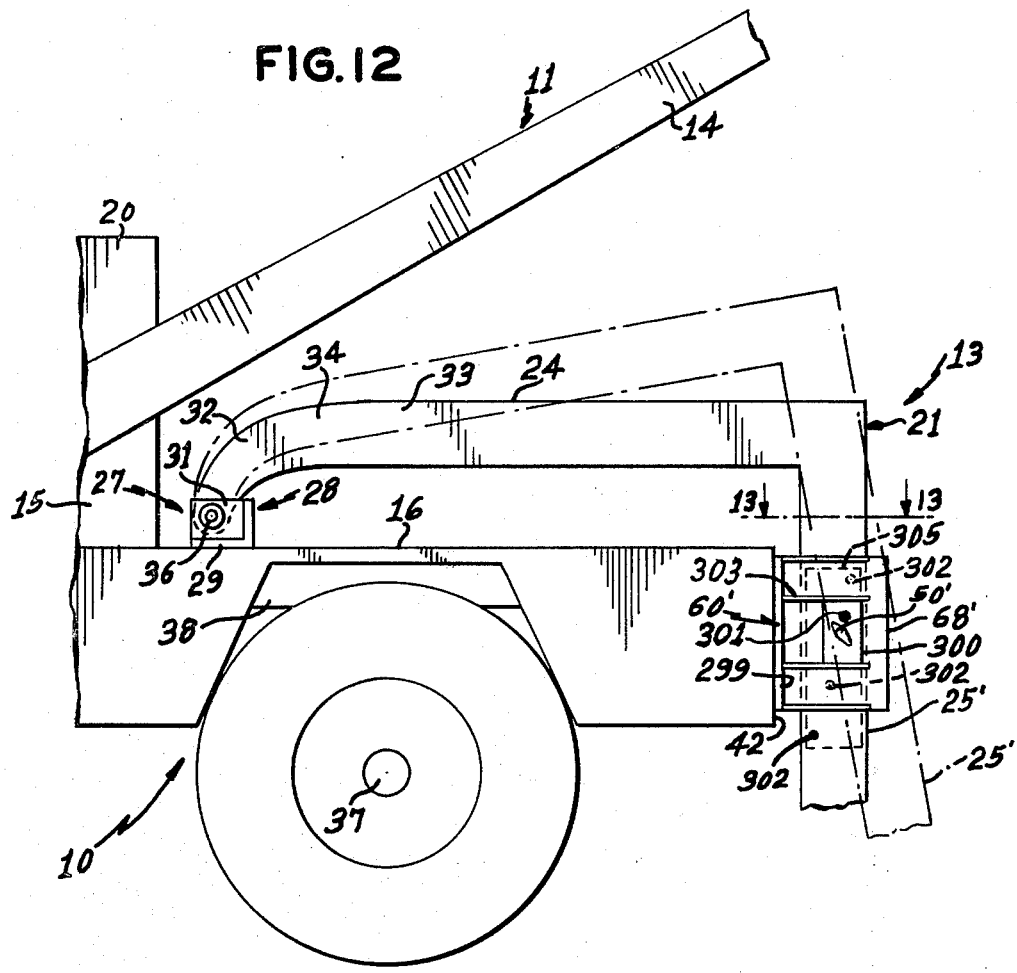
FIG. 12 is a partial elevation of the wrecker truck showing a further modification.
Figure 13:
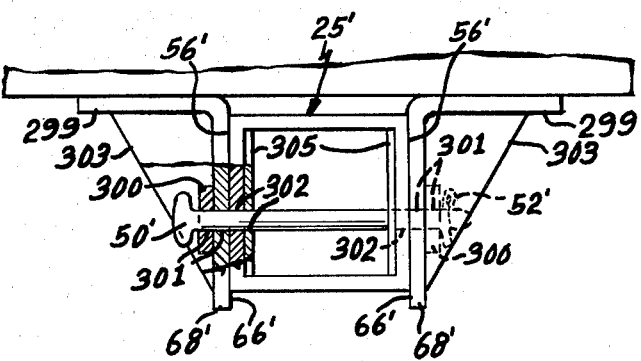
FIG. 13 is a partial sectional view on line 13—13 of FIG. 12.

In the preferred embodiment, only the mounting plate 60 and bracket members 66 of the above power lift assembly 58 are used, FIGS. 1 and 2 to provide guide means for lift boom 21. Each bracket member 66 may be simplified. The inner side 68 and reinforcing gussets, as shown in FIGS. 12 and 13 would provide guide means and be sufficient since the lift cylinders 70 are omitted in the preferred embodiment and the support means is not required.

A cable guide 80, is secured to the upper boom portion 22 at the knee 26 to retain the cable 17 close to the vertical beam 25 when derrick 11 is used to lift or lower the lift boom 21 and/or the lower boom portion 23 or to move a vehicle for loading on vehicle lift assembly 12. Cable guide 80 has a base 81 of U-shape fitting over the rear wall 82 of horizontal and vertical beams 24, 25 at the knee 26 and secured, e.g. by bolts, to sidewalls 33 or 56 thereof and a retainer 83 a J-shaped or hook-like member, having the straight portion secured to the rear face of base 81 and the reversely bent or hook portion having its end facing and spaced from the rear face of base 81, so cable 17 can be placed in the hook portion and retained therein while lifting or lowering the lift boom 21 and/or the lower boom portion 23 or while moving a vehicle.

The lower boom portion 23, FIGS. 1, 1A, 2, 6 and 7 for the preferred embodiment and FIGS. 4 and 5 for the modification, has a ram beam member 85 telescopically mounted in an outer beam member 86 for limited reciprocating movement. The ram and outer beam members 85, 86 are rectangular tubular beams made like the above described horizontal and vertical beams 24, 25. The ram beam member 85 telescopically fits in outer beam member 86 with clearance for free relative sliding or telescopic movement and inhibits lateral movement under load and the rectangular cross section shape prevents relative rotation under load. Upper and lower pad bearings 281, 282 are used to provide improved free sliding movement of ram beam member 85 in outer beam member 86.

The upper and lower pad bearings 281,282 as shown in detail FIG. 4A respectively have a frame 283, 284, and a pad 286, 287. The upper and lower frames 283, 284, are made of sheet steel and respectively have a base 288, 289 with a retainer lip 291, 292 on all edges. The upper and lower pads 286, 287 are made of bearing material, preferably plastic, e.g. bearing grade nylon, and are seated respectively on base 288, 289 and retained by retainer lip 291, 292. Both bearing pads 281, 282 have a width slightly greater than the exterior width of ram beam member 85 and slightly less than the interior width of outer guide beam member 86, FIG. 4A and a length about twice their width as shown by upper pad bearing 281, FIG. 1A. The upper pad bearing 281, FIGS. 1A and 4A is secured to ram beam member 85 by securing e.g. welding upper base 288 to top wall 143 of ram beam member 85 at the base end 136 so upper pad 286 has bearing contact with the inside surface of top wall 98 of outer guide beam member 86.

The lower pad bearing 282, FIGS. 4A and 6 is secured to outer guide beam member 86 by securing e.g. by welding lower base 289 to the inside surface of bottom wall 100 of outer guide beam member 86 so lower pad 287 has bearing contact with the outside surface of the bottom wall 144 of ram beam member 85. A stop member 293 is removably secured, e.g. by screws to the inside of top wall 98 of outer beam member 86 at distal end 139 and cooperates with upper pad bearing 281 to provide stop means to limit extending movement of ram beam member 85 in a load supporting range of movement.

A boom hinge 87, FIGS. 1, 1A, 4 and 5, pivotally connects and supports outer beam member 86 at the lower end 88 of vertical beam 25 for pivotal movement about a transverse horizontal axis and limits movement at the loading position. Boom hinge 87 has a pair of hinge plates 89, each having an attaching portion 90 and a projecting portion 91. Each attaching portion 90 overlaps a side wall 92 of outer beam member 86 over the large area below vertical beam 25 and is secured to the side wall 92 of outer beam member 86. Each projecting portion 91 has a right triangular shape with the rear edge 93 aligned with the face of rear wall 82 of vertical beam 25 in loading position, FIG. 1A and a front edge 94 sloped rearwardly toward the top. Near the top or apex of the projecting portions, each projecting portion 91 has a pivot bearing 95, FIG. 4, secured in an aperture. A pivot bearing 96 is secured in apertures in side walls 56 of vertical beam 25. The pivot bearings 95, 96 are aligned to receive pivot pin 97 which includes known retention means (not shown) to pivotally mount outer beam member 86 on vertical beam 25. The projecting portions 91 face the opposite side walls 56 with clearance for free pivotal movement but prevent lateral and twisting movement of outer beam member 86 relative to vertical beam 25. The projecting portions 91 are sufficiently long to locate the pivot pin 97 and thus the transverse horizontal pivot axis a sufficient distance above the lower end 88 of vertical beam 25 and bracket 101 so bracket 101 has clearance during pivotal movement and lower boom portion 23 is above lower end 88 of vertical beam 25 in storage position FIG. 11.

Bracket 101, FIGS. 1, 1A, a and 4, has a transverse plate 102 of rectangular shape secured at its edges to the rear edge 93 of both projecting portions 91 of hinge plates 89 and to top wall 98 of outer beam member 86 and a longitudinal plate 103 secured centrally to the transverse plate 102 and the top wall 98. The bracket 101 provides a corner brace for hinge plates 89 and an abutment when transverse plate 103 engages rear wall 82 of vertical beam 25 to limit downward pivotal movement of outer beam member 86 relative to vertical beam member 25 in the loading position shown in FIG. 1. The longitudinal plate 103 has on one side, a pulley 104 rotatably mounted on a pulley shaft 105 secured to longitudinal plate 103 to guide cable 17 for horizontal pulling as explained below, a slide bolt hole 106 and a hook eye 108. The boom lock 107 of the slide bolt type is secured to rear wall 82 of vertical beam 25 and is in a position so the bolt 110 may be moved into slide bolt hole 106 when lower boom portion 23 is in storage position, FIG. 11, to hold the lower boom portion 23 in storage position. The hook eye 108 receives cable hook 18 to raise and lower lift boom 21 and/or lower boom portion 23. The boom lock 107 is secured on rear wall 82 so it is adjacent to the other side of longitudinal plate 103, the side opposite the one side where the pulley is located, when lower boom portion 23 is in storage position. In boom lock 107, the manually moved bolt is retained by a detent or other means in both engaged and disengaged positions by a known means not shown. Abutments 109, FIG. 1A, are secured to the opposite sidewalls 56 of vertical beam 25 and engage front edge 94 of hinge plates 89 to act with transverse plate 102 to limit or stop pivotal movement of lower boom portion 23 in the loading position shown in FIG. 1. During movement of lift boom 21 on mounting hinge 27, the abutments 109 clear the bracket member 66.

The ram beam member 85, FIGS. 1 and 5, has a reinforcing plate 111 of rectangular shape flatly secured to both of its side walls 112. A series of longitudinally spaced lock pin holes 113 extend transversely through one reinforcing plate 111 and the one side wall 112 to which said one reinforcing plate 111 is secured. The ram lock 114 of the slide pin type has a body 115 secured to the outer surface of side wall 92 of outer guide beam member 86 and a slide pin 117 slideably mounted in body 115 and pin aperture 116 in side wall 92 for limited transverse movement from a disengaged position withdrawn from lock pin holes 113 to an engaged position projecting into a selected one of the lock pin holes 113 to lock ram beam member 85 to outer guide beam member 86 in any one of a plurality of adjustable length positions. Slide pin 117 has a handle 118 for manual operation.

The ram lock is a known type having a spring (not shown) biasing the slide pin 117 to engaged position and a square stop shank on handle 118, or a stop pin (not shown) on slide pin 117 fitting in a recess in body 115 permitting limited movement between engaged and disengaged positions and operative on partial turning of handle 118 in disengaged position to hold slide pin 117 in disengaged position. The above boom lock 107 may be similar. Guard stops 119 secured to both side walls 92 of outer beam member 86 on both sides or ram lock 114 guard ram lock 114 and position wheel forks 147 in storage position, FIGS. 2 (dot-dash lines) and 11.

In the modification, FIGS. 4 and 5, a hydraulic ram assembly 120 has a hydraulic ram cylinder 121 located and extending longitudinally within the rectangular tubular ram beam member 85. Hydraulic ram cylinder 121 has a cylinder 122, FIG. 4, with a closed end closure 123, a rod end closure 124, a piston 125 mounted for reciprocation in and sealed to cylinder 122 and a rod 126 secured to piston 125 and extending through and sealed to rod end closure 124. A thrust abutment 127, a U-shaped member, has sides 128 and a base 129. The sides 128 are positioned on the outside of attaching portion 90 of hinge plates 89 at the hinge end 99 of outer beam member 86 and secured thereto by bolts or machine screws extending through hinge plates 89 and sidewalls 92 of outer guide beam member 86. Base 129 extends transversely across hinge end 99. A pivot connection 130, FIG. 5, between cylinder 121 and thrust abutment 127 provides limited pivoting to accommodate bending under load and transmits load in both directions to extend and retract ram beam member 85. The pivotal connection has a pair of apertured ears 131 secured on closed end closure 123 of cylinder 122, an attaching eye 132 secured on the inside of base 129 and located between apertured ears 131 and a pivot bolt 133 extending horizontally through both apertured ears 131 and attaching eye 132. Since thrust abutment 127 in addition to providing a thrust abutment for cylinder 121 also may limit retracting movement of ram beam member 85 it is also used in the preferred embodiment FIGS. 1 and 1A.

The rod 126 has at its distal end a connecting eye 134. An anchor pin 135 extends horizontally into apertures in side walls 112 and reinforcing plate 111 of ram beam member 85 near king pin end 137 and through connecting eye 134. The anchor pin 135 is retained by being threaded in one side wall 112 and is within or flush with both reinforcing plates 111 on side walls 112, so this portion of ram beam member 85 may slide in outer beam member 86. Anchor pin 135 has threads at one end and a tool recess, e.g. screw driver slot, at the other end for installation and removal.

Both the preferred embodiment and the modification have, as shown in FIGS. 5, 6 and 7, at the king pin end 137 of ram beam member 85 a pivot member 138 of tubular shape fitting inside the rectangular tubular ram beam member 85 and secured therein. This portion of ram beam member 85 in fully retracted position extends beyond the distal end 139 of outer beam member 86 to provide clearance for pivot assembly 146. The king pin 141 is rotatably mounted in vertical king pin bore 142 extending through the top wall 143 and bottom wall 144 of ram beam member 85 and pivot member 138 to pivotally support pivot assembly 146 on ram beam member 85.

The pivot assembly 146, FIGS. 1, 2, 6 and 7 is pivotally mounted by king pin 141 on ram beam member 85 and supports a pair of lift forks 147 in a fixed position for the wheel engaging, loading and lifting operations and provides for relative pivotal movement to a storage position so the sling 148 may be used or the lower beam portion 23 moved to normal storage position. The pivot assembly 146 has a cross member 149, preferably a rectangular tubular member and top and bottom pivot plates 151, 152. Spacer plates 150 are secured to pivot plates 151, 152 to hold them in spaced parallel relation and to cross member 149 to reinforce pivot assembly 146. Each of pivot plates 151, 152 have a base portion 153 overlapping and secured, centrally to the top and bottom of cross member 149 and a projecting portion 154 extending forwardly and overlapping the king pin end 137 of the top wall 143 and bottom wall 144 of ram beam member 85 with sufficient clearance to permit relative pivotal movement and prevent relative vertical and twisting movement. The top and bottom pivot plates 151, 152 have aligned pivot holes 155. The king pin 141 fits in the pivot holes 155 and king pin bore 142 to pivotally mount pivot assembly 146 on ram beam member 85 for lateral pivotal movement about a vertical axis. The front edges 156 of the top and bottom pivot plates 151, 152 are rounded to provide clearance with distal end 139 of outer beam member 86 when ram beam member 85 is in fully retracted position. A retainer disc 157 is detachably secured, e.g. by a machine screw, to the bottom end of king pin 141 and engages the bottom of pivot plate 152. A sling support bar 158 is secured to the top of king pin 141. Thus, king pin 141 is retained in king pin bore 142 and pivot holes 155. Stops 160 secured on top plate 151 at each side of support bar 158 rotate support bar 158 with pivot assembly 146. Support bar 158 extends horizontally over outer beam member 86 to support sling 148 in sling storage position. A sling pivot pin 159 is secured in centrally located apertures in the front and rear walls 161, 162 of cross member 149 and extends rearwardly and horizontally in alignment with pivot assembly 146. A spacer 163, a U-shaped member, has an apertured base fitting over a sling pivot pin 159 and the ends of the sides are secured to rear wall 162 of cross member 149 to support sling pivot pin 159 and space bottom sling bar 217 of sling 148 from other portion of pivot assembly 146.

A guide pulley 164, FIG. 6, positioned horizontally and fixed on a pulley shaft 165 rotatably mounted in aligned bores 170, in sling support bar 158 and king pin 141. The guide pulley 164 rotates about a vertical axis and is used to guide cable 17 or a chain extending from pulley 104 to a vehicle to be parallel to outer and ram beam members 86, 85 and then extends at any rearward angle to a vehicle.

Pivot members 166 are vertically secured to front wall 161 at the opposite ends of cross member 149. A pivot bore 167 extends vertically through each pivot member 166. Similar locking members 168 are vertically secured to rear wall 162 at opposite ends of cross member 149. A locking bore 169 extends vertically through each locking member 168. The pivot and locking members 166, 168 have the same height as cross member 149 and are outboard of pivot plates 151, 152.

The pair of wheel forks 147, FIGS. 1 and 2, includes a right and a left wheel fork 171, 172, as viewed from the rear, which are similar and each has an arrangement of parts in mirror image or allochiral relation to the other. Each of wheel forks 171, 172 has a base bar 173 having the same rectangular tube cross section as cross members 149 and extending transversely from an inboard end 174 at one end of cross member 149 to an outboard end 175. An outboard tine bar 176 is secured to outboard end 175 of base bar 173. An inboard tine bar 177 is secured to an intermediate portion of base bar 173. The inboard and outboard tine bars 176, 177 are secured at a right angle to base bar 173, and extend rearwardly horizontally in spaced parallel relation to each other. Similar upper and lower attaching plates 181 are secured to the upper and lower walls of base bar 173 at the inboard end 174 and have respectively upper and lower extending portions 183 which extend transversely beyond each side of base bar 173 and beyond the inboard end 174 of base bar 173 so they overlap and engage the top and bottom surfaces of the adjacent end of cross member 149, one pivot member 166 and one locking member 168 on one side of pivot assembly 146 with clearance for pivotal movement but preventing relative vertical axial and twisting movement. The upper and lower attaching plates 181 have at the forward end, pivot holes 186 aligned with one pivot bore 167 and at the rear end locking holes 187 aligned with one locking bore 169 on the adjacent side of pivot assembly 146. A pivot bolt 188 fits in the aligned pivot holes 186 and pivot bore 167 on each side of pivot assembly 146 and is secured therein, e.g. by a nut, to provide a fork hinge 189 for each of the right and left wheel forks 171, 172.

A locking pin 191 fits in the aligned pair of locking holes 187 and locking bore 169 on each side of pivot assembly 146 to provide fork locks 192 for locking each of the right and left wheel forks 171, 172 in a fixed position relative to pivot assembly 146. When the locking pin 191 is inserted, each wheel fork lock 192 functions in cooperation with fork hinge 189 for each of the wheel forks 171, 172 to rigidly secure each wheel fork to cross member 149 and pivot assembly 146 to provide a rigidly interconnected dual fork assembly 193. Each of locking pins 191 have a handle for insertion and removal. The axis of each fork hinge 189 is laterally spaced one half the overall width of the lower boom portion 23 from the vertical pivot axis of king pin 141. When the locking pins 191 are removed, each wheel fork 171, 172 may be pivotally moved from the loading position, FIGS. 1 and 2 (solid lines) to retracted storage position, FIGS. 2 (dot-dash lines) and 10, to prepare the vehicle lift assembly 12 for use of sling 148 or for movement of lower boom portion 23 to storage position, FIG. 11.

Each tine bar 176, 177, FIG. 1, has a skid member 196 of V-shape formed on or secured on the distal end so the tine bars will slide on the ground or road surface. A roller wheel 197 is mounted in each tine bar near the distal end and projects through opening 198 in bottom wall 195 and rotates on axle 199 mounted on side walls 200 to provide roller wheel support of the tine bars on a hard road surface. The skid 196 may be omitted and roller wheel 197 mounted just beyond the end of the tines on a cantilever base secured to the tines to function as a roller skid. An equally spaced series of bearing bushings 201 is mounted horizontally and extend through the side walls 200 of each tine bar 176, 177 to provide holes to receive a support rod 206. The support rod 206, a round steel rod, is positioned in the holes of a selected aligned pair of bushings 201 of the spaced series of bushings in outboard and inboard tine bars 176, 177 of each wheel fork 171, 172, so the distance between support rod 206 and base bar 173 of each wheel fork 171, 172 is sufficiently less than the diameter of the wheel 207 of the vehicle 208 to provide cradles to engage and retain a front or rear pair of wheels 207 for lifting and towing vehicle 208. The support rods 206 extend between, and a short distance beyond, the outboard and inboard tine bars 176, 177 and are rotated and retained by the wheel load in bearing bushings 201, but known retainer means, such as a retainer pin, may be used.

Figure 9:
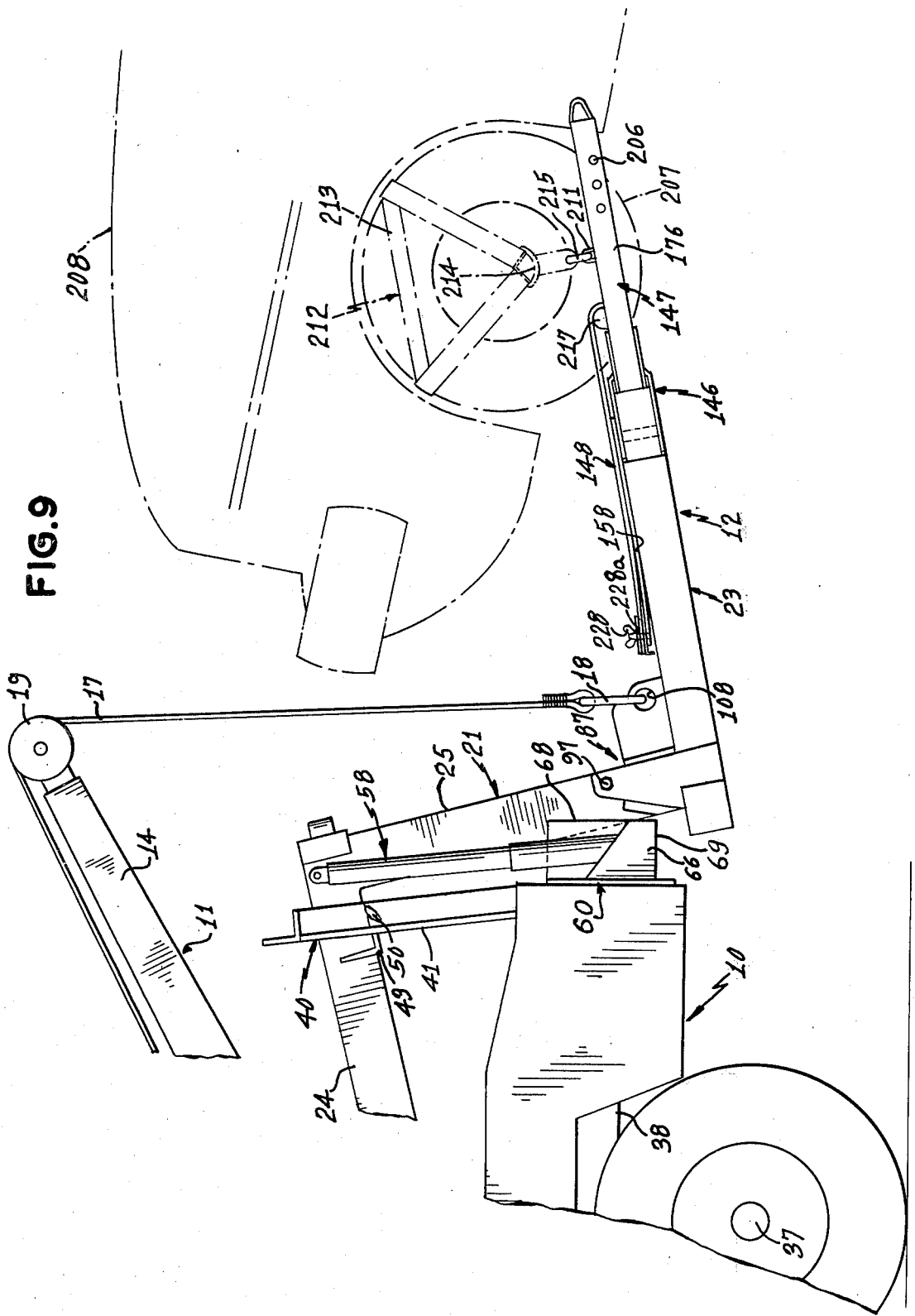
FIG. 9 is a partial elevational outline view of the vehicle lift assembly supporting a vehicle in towing position and showing the added power lift assembly of the modification.

The outboard tine bars 175 have an attaching eye 211 secured centrally on the outboard side or top. A known wheel hold down strap 212, FIG. 9, having a strap loop 213 of nylon strap material, a tightening ratchet 214 and an attaching hook 215. The attaching hook 215 is hooked in the attaching eye 211, the strap loop 213 placed over the wheel 207 and strap loop 213 is tightened on wheel 207 by tightening ratchet 214 to hold wheel 207 on support rod 206 and base bar 173 in each of wheel forks 171, 172.

The sling 148, FIGS. 1 and 2, a dual strap type sling, has a bottom sling bar 217, a top sling bar 218, and a pair of connecting straps 219, of flexible material, connected between the top and bottom sling bars 217, 218. The bottom sling bar 217 has a pivot member 221, FIGS. 2, 6 and 7, secured centrally thereof and extending downwardly. Pivot member 221 has a pivot hole 222 to receive sling pivot pin 159 and is retained on sling pivot pin 159 by a threaded nut 223 and retainer pin 224 to pivotally mount bottom sling bar 217 on sling pivot pin 159 and pivot assembly 146 for pivotal movement about a horizontal longitudinal axis. The bottom sling bar 217 has a sling hook 225 at each end for attaching sling chain 233 to bottom sling bar 217. The sling hooks 225 project beyond opposite ends of bottom sling bar 217 and rest on top of inboard tine bar 177 of each wheel fork 171, 172 when the sling 148 is in storage position and wheel forks 171, 172 are in loading position to hold sling 148 horizontally in storage position. The top sling bar 218 has a sling hook 226 at each end for attaching a sling chain 233, FIG. 10 and shackles 230 for cable hook 18. A vertical bore 227, FIG. 2, is provided near the inboard end 174 of both base bars 173 to receive shaft 165 so pulley 164 which is normally mounted on king pin 141 can also be mounted on either base bar 173. Retainer means (not shown) like retainer pin 224, is used to retain pulley 164 and attached shaft 165 on base bar 173. A stud and wing nut 228 has the stud secured to the distal end of sling support bar 158 and extending through aperture 288a in top sling bar 218 so the wing nut holds top sling bar 218 transversely and horizontally on sling support bar 158 to hold sling 148 in storage position. The sling 148 in storage position oscillates with pivot assembly 146 and does not impede rotation and use of dual fork assembly 193 for wheel lifting and towing a vehicle. A D-ring 229 is rotatably mounted in a mounting member or tube 235, FIGS. 6 and 7, secured to the top of cross member 149 to provide attaching means to lift and lower the lower boom portion 23.

Though not normally required a pivot lock pin 231 may be used. The pivot lock pin 231, FIGS. 1, 2, 6 and 7 is placed in aligned lock holes 232 in top and bottom pivot plates 151, 152 and ram beam member 85 only when it is desired to lock pivot assembly 146 in straight line alignment with ram beam and outer beam members 85, 86. The pivot lock pin 231, though not normally used, is used to prevent rotation of pivot assembly 146 and wheel forks 147 locked together when lower boom portion 23 is raised to storage position with wheel forks 147 locked in loading position on pivot assembly 146 or when there is unequal resistance to movement of right and left wheel forks 171, 172 during movement alongside or under vehicle wheels 207 or when wrecker truck 10 is on ground having a steep transverse slope and it is desired to retain wheel forks 147 in aligned loading position. The pivot lock pin 231 is not used during normal loading and during towing so dual fork assembly 193 oscillates for proper tracking of the towed vehicle.

In vehicle lift assembly 12, boom mounting assembly 28 with its hinge 27 is mounted centrally or forwardly on wrecker truck platform 16. The wrecker cable 17 or power lift assembly 58 applies lift force to a lift force point on lift boom 21 near vertical beam 25 and reacts on wrecker truck 10. The lower boom portion 23 has the shortest length in adjusted length positions from vertical beam 25 to the vehicle load point near the center of wheel forks 147 that will accommodate vehicle overhang and forcing wheel forks 147 under vehicle wheels 207. Thus the lever distance from boom mounting assembly 28 to the load point is only about twice the lever distance to the lift force point so the lift force is only about twice the vehicle load.

In pivot assembly 146, cross member 149 and attached base bars 173 of wheel forks 147 are spaced rearwardly of king pin 141 a distance substantially equal to one half the over all width of lower boom portion 23 (outer beam member 84 and guard stops 119, so dual fork assembly 193 which includes pivot assembly 146 can oscillate from a longitudinal position through an angle of about 90° in either direction. The vehicle wheels 207 rest on base bars 173 and support rods 206, so the vehicle load is closely spaced rearward of base bars 173. Thus there is a low bending moment due to load on pivot assembly 146 and king pin 141. Grease fittings (not shown) are used to lubricate mounting hinge 27, boom hinge 87, and king pin 141.

CONTROL SYSTEM

The hydraulic control system, FIG. 8, is used only in the modification to control hydraulic lift cylinders 61 and hydraulic ram cylinder 121. The power unit 236 has an electric motor 237 driving a hydraulic pump 238 for pumping fluid from reservoir 239 having air vent 241 to supply line 242 at a pressure regulated by relief valve 243 located in hydraulic pump 238 and by passing excess fluid directly to reservoir 239. The relief valve 243 preferably has an external control to adjust the regulated pressure to the desired pressure value, e.g. 2,000 psi, 13,790 KPa. A battery 244 is connected by conductor 246 when switch 247 is closed and by ground conductor 248 to energize electric motor 237 to drive hydraulic pump 238 to supply fluid at a regulated pressure to supply line 242.

The ram control valve 249, a known 4-way valve, has a valve element 251 rotatably mounted in bore 252 in body 253. Handle 254 is connected to valve element 251 to rotate both from the off position OFF, shown in solid lines, to extend position E and retract position R, shown by the dotted line positions, of handle 254. In off position OFF, supply line 242 is connected via an axial supply port 256 and a radial supply port 257 to intervalve line 258, extend working line 259, which is connected to cylinder 122 at closed end closure 123 or extend chamber 260, is blocked by extend exhaust port 261 and retract working line 263 which is connected to cylinder 122 at rod end closure 124 or retract chamber 264 is blocked by retract exhaust port 265 to hydraulically hold hydraulic ram cylinder 121 and supply fluid pressure to lift control valve 267 for operation of hydraulic lift cylinders 61. In extend position E, radial supply port 257 supplies extend working line 259 and extend chamber 260 and retract chamber 264 is exhausted via retract working line 263, retract exhaust port 265, intervalve line 258, lift control valve 267, and return line 275 to reservoir 239 to extend hydraulic ram cylinder 121 and ram beam member 85. To retract position R, radial supply port 257 supplies retract working line 263 and retract chamber 264 and extend chamber 260 is exhausted via extend working line 259 extend exhaust port 261, intervalve line 258, lift control valve 267, and return line 275 to reservoir 239 to retract hydraulic ram cylinder 121 and ram beam member 85.

The lift control valve 267, a known 3-way valve, has a valve element 268 rotatably mounted in bore 269 of valve body 271. A handle 272 is connected to valve element 268 to rotate both from the off position OFF, solid lines, to up position UP and down position DOWN, shown by handle 272 in dotted lines. In off position OFF of lift valve 267, intervalve 258 is connected via axial port 273 and radial port 274 to return line 275 connected to reservoir 239 and lift working line 275 is blocked by lift exhaust port 277 to hydraulically hold lift cylinders 61.

Lift working line 276 is connected to the lift chamber 278 in each of the lift cylinders 270 adjacent closed end 71. Fluid under pressure is supplied from supply line 242 via ram control valve 249 in off position OFF to intervalve line 258 to supply lift control valve 267 which connects the fluid via axial port 273 and radial port 274 to lift working line 276 and lift chambers 278 to operate hydraulic lift cylinders 61 to lift the lift boom 21. Lift control valve 267 in down position connects lift chamber 278 and lift working line 276 via lift exhaust port 277 to return line 275 and reservoir 239 to exhaust lift chambers 278 and blocks fluid supply at radial port 274 to operate hydraulic lift cylinders 61 for down movement of lift boom 21.

When one of the ram and lift control valves 249, 267 are operated, the other must be in off position OFF, as fluid under pressure is supplied by ram control valve 249 to lift control valve 267 and return exhaust flow from ram control valve 249 is through lift control valve 267. When both ram and lift control valves 249, 267 are in off position they provide by-pass fluid flow from supply line 242 through both valves and intervalve line 258 to return line 275 and reservoir 239 to unload pump 238.

The power unit 236, switch 247, and ram and lift control valves 249, 267, FIG. 11, are mounted on a side wall 33 of horizontal beam 24. The lines are conventional pipe, tubing or hose mounted on horizontal beam 24 and passing above or through an aperture (not shown) in vertical leg 55 of angle iron 53 to lift cylinders 61 and internally in vertical beam 25 and ram beam member 85 to hydraulic ram cylinder 121 with a suitable flexible portion with sufficient excess length and guides in the region of boom hinge 87 to accommodate the pivotal movement of lower boom portion 23 on boom hinge 87.

OPERATION

When wrecker truck 10 arrives, the vehicle lift assembly 12 is in storage portion, FIG. 11. With upper boom portion 22 mechanically supported by support pin 50 of boom support assembly 40 in an upper position for road clearance. The lower boom portion 23 is folded on boom hinge 87 to a substantially vertical position to reduce overhand and locked by slide bolt boom latch 107. The wheel forks 147 are normally folded to unlocked storage position alongside lower boom portion 23 to reduce the height, but may be locked by locking pins 191 in loading position and pivot assembly 146 locked by pivot lock pin 231. Then wrecker truck 10 is backed in line to the vehicle 208 to be lifted and towed but spaced from such vehicle so the lower boom portion 23 may be lowered. Then winch 20 is used to reel out cable 17 and hook 18 is attached to D-ring 229.

With boom latch 107 and ram lock 114 engaged, cable 17 is used to lift vehicle lift assembly 12 to unload support pin 50 for removal and reinsertion in a proper lower loading position. The vehicle lift assembly 12 is lowered to rest on support pin 50 at loading height. Then boom lock 107 and ram lock 114 are unlocked and cable 17 reeled in to vertically lift ram beam member 85 and attached pivot assembly 146 and wheel forks 147 to extended position and ram lock 114 reengaged. Then cable 17 is reeled out to lower or swing lower boom portion 23 on boom hinge 87 to its down or substantially horizontal loading position, FIG. 1, limited by abutments 109 and transverse plate 102. In loading position the lower boom portion has a small slope rearwardly and downwardly so the skid means provided by skids 196 and roller wheels 197 first engage level ground and the remainder of lower boom portion 23 is spaced from the ground. The vehicle lift assembly 12 may be lowered from the upper to lower position after the ram beam member 85 is extended or with cable hook 18 in hook eye 108 after the lower boom portion is lowered to horizontal loading position.

Then in the normal procedure for loading vehicle wheels 207 on wheel forks 147, pivot lock pin 231, if inserted, is removed and wheel forks 147 if in proper storage position are swung to loading position and locked by locking pins 191 so wheel forks 147 are locked in loading position, FIGS. 1 and 2, on pivot assembly 146. Then the unitary dual fork assembly 193, wheel forks 147 and pivot assembly 146 are rotated on king pin 141 so tine bars 176, 177 of each wheel fork 147 straddles a wheel 207 and tine bars 176, 177 are parallel to vehicle 208 and substantially aligned with or at a small angle to lower boom portion 23. Then in one method support rods 206 are removed and wrecker truck 10 is backed until the rear side of base bars 173 of wheel forks 147 engage the tires of a pair of opposed wheels 207. The dual fork assembly 193 pivots on king pin 141 so each one of base bars 173 engage one wheel 207 with equal pressure. Then support rods 206 are reinserted in the holes of a pair of bearing bushings 201 selected to be as close as possible to wheels 207 to cradle wheels 207 between support rods 206 and base bars 173.

In a second method, the support rods 206 are inserted in the holes of an appropriate pair of bearing bushings 201 spaced from base bars 173 a distance a little less than the diameter of wheels 207 so wheel forks 147 cradle wheels 207. Then with chocks behind the other pair of wheels of vehicle 208, wrecker truck 10 is backed up so support rods 206 first engage wheels 207. In a small range of pivotal movement of dual fork assembly 193 on king pin 141 insures equal engagement pressure on both wheels 207 and correct alignment. Then wrecker truck 10 is further backed to force support rods 206 under wheels 207 until base bars 173 engage vehicle wheels 207 to cradle vehicle wheels 207 for lifting.

The next step is to retract the ram beam member 85 to its normal towing position in which lower boom portion 23 is shortened to provide the proper minimum clearance between vehicle 208 and wrecker truck 10 to permit turning during towing. The ram lock 114 is disengaged. In the first method with vehicle 208 held by a chock, wrecker truck 10 is backed to retract ram beam member 85 from loading position to towing position. In a second method, winch 20 and cable 17 is used to raise lift boom 21 and vehicle 208 a short distance, e.g. 12″, above the ground. With cable hook 18 in D-ring 229 or hook eye 108, cable 17 is reeled in to raise lift boom 21.

After inserting support pin 50 in boom support assembly 40, lift boom 21 is lowered to rest on support pin 50. Then cable 17 is placed on pulley 104 and hook 18 in D-ring 229. Winch 20 is used to pull cable 17 to retract ram beam member 85 from loading to towing position. Then in both methods, ram lock 114 is engaged.

When vehicle wheels 207 are loaded on wheel forks 147 and ram beam member 85 is in towing position, lift boom 21 raised to towing height or position. With hook 18 in hook eye 108, cable 17 is reeled in to raise lift boom 21. After support pin 50 is placed in the desired pair of support holes 49, cable 17 is reeled out to lower lift boom 21 to rest on support pin 50 of boom support assembly 40. Wheel hold down straps 212 may have been attached for lifting or are now attached for towing. For safety, hook 18 remains or is placed in hook eye 108 and winch 20 used to tighten and hold cable 17 to provide back up support for lift boom 21 during towing in both the preferred embodiment and modification. This back up support may also be used in storage position.

To unload vehicle 208, hold down straps 212 are detached, hook 18 is attached in hook eye 108 and winch 20 used to reel in cable 17 to slightly raise lift boom 21 to unload and remove support pin 50. Then lift boom 21 is lowered to rest vehicle 208 on the ground so support rods 206 are unloaded and removed. Wrecker truck 10 is then moved forwardly away from vehicle 208, to move wheel forks 147 from under vehicle 208. Alternatively support rods 208 need not be removed and with vehicle 208 held by chocks, wrecker truck 10 is moved forwardly to pull support rods 206 under wheels 207 and wheels forks 147 from under vehicle 208. Then cable hook is engaged in D-ring and ram lock 114 engaged. The wheel forks 147 may be in unlocked storage position or locked by locking pins 191 in loading position and pivot lock pin 231 locking pivot assembly 146. Then cable 17 is reeled in to raise lower boom portion 23 to vertical storage position and boom lock 107 is engaged and lift boom 21 is raised to storage position.

In the hydraulic modification, with ram beam member 85 in retracted position, ram lock 114 engaged and hook 18 placed in D-ring 229, the boom lock 107 is disengaged and cable 17 is reeled out to lower or swing lower boom portion 23 on boom hinge 87 to its down or substantially horizontal loading position. The cable 17 is removed and reeled in by winch 20. Then switch 247, FIG. 8 is closed to energized power unit 239 to supply fluid under pressure to supply line 242. Lift control valve 267 is moved to up position UP to supply lift cylinders 61 to raise lift boom 21, upper and lower boom portions 22, 23 raise together, a short distance to unload support pin 50. The lift control valve 267 is returned to off position OFF to hydraulically hold lift boom 21 while support pin 50 is removed from support frame 41. Lift control valve 267 is moved to down position DOWN to exhaust lift cylinders 61 to permit the lift boom 21 to swing about mounting hinge 27 to loading position FIG. 1, with lower boom portion, especially wheel forks 147 locked in loading position at ground level. Wrecker truck 10 is repositioned so support rods 206 at the entrance end of both wheel forks 147 are substantially touching both of the wheels 207 at the end of vehicle 208 that is to be lifted.

Then ram lock 114, FIGS. 1 and 5, is released and ram control valve 249 moved to extend position E to supply fluid under pressure to hydraulic ram cylinder 121 to extend lower boom portion 23 and advance ram beam member 85, pivot assembly 146 and wheel forks 147 to force support rods 206 under vehicle wheels 207. Since support rods 207 are round and rotatably mounted on outboard and inboard tines 175, 177 they normally move easily under vehicle wheels 207, which then are supported by support rod 206 and base bar 173 of each wheel fork 147 to cradle support vehicle 208 for lifting. Also, support rods 206 may be removed so wheel forks 147 may be similarly moved by hydraulic ram cylinder 121 alongside wheels 207. Then support rods 206 are replaced to cradle wheels 207 for lifting.

The reaction force to forcing wheel forks 147 under vehicle wheels 207, is transmitted from ram beam member 85 in the hydraulic modification through hydraulic ram cylinder 121 and thrust abutment 127 and in the mechanical embodiment through ram lock 114 to outer beam member 86. In both embodiments, the reaction force is transmitted from outer beam member 86 by boom hinge 87, transverse plate 102 and abutments 109 to vertical beam 25 of upper boom portion 22 which is mounted by mounting hinge 27 on wrecker truck 10.

Then using lift control valve 267 to actuate hydraulic lift cylinders 61 to lift the lift boom 21 and vehicle to a proper towing height, insert support pin 50 in an aligned pair of support holes 49 just below lift boom 21 and lower lift boom 21 to rest on support pin 50. Then use ram control valve 249 to actuate hydraulic ram cylinder 121 normally retract or extend ram beam member 85 to vary the length of lower boom portion 23 to provide proper clearance between the vehicle 208 and vertical beam 25 for turning during towing. Ram beam member 85 is located and locked by ram lock 114 in one of the series of locking positions. Then with both the ram and lift control valves in off position providing by-pass flow unloading pump 238, the switch 247 is opened to shut down the hydraulic system. Hold down straps 212 are now applied or may have been applied before lifting to hold the vehicle wheels 207 on wheels forks 147. Then the vehicle 208 is mounted by vehicle lift assembly 12 on wrecker truck 10 for towing.

Upon reaching the destination and placing the vehicle 208 in the desired position, vehicle 208 is unloaded. The hold down straps 212 are removed now or after the lift boom 21 is lowered. To lower lift boom 21, the switch 247 is closed, so the power unit 236 supplied fluid under pressure to the lift and ram control valves 267, 249. The lift control valve 267 is operated to raise lift boom 21 so support pin 50 can be removed and then lower lift boom 21 to ground level so wheels 207 rest on the ground. Then after releasing ram lock 114 and with support rods 206 in place and vehicle 208 held by a chock, the ram control valve 249, in retract position R, retracts or pulls both wheel forks 147 from under vehicle wheels 207 to unload the vehicle 208. Also support rods 206 may be removed for pulling wheel forks 147 from under vehicle 208.

Then to place vehicle lift assembly 12 of both the preferred embodiment or modification in storage positions, FIG. 11, the ram beam member 85 is fully retracted either mechanically or hydraulically as pointed out above and ram lock 114 engaged. Then preferably locking pins 191 are removed and wheel forks 147 folded to storage position, dot-dash lines, FIG. 2, alongside lower boom portion 23. A pair of rubber shock cords not shown or other fastening means, each attached to lower boom portion 23 at or near boom hinge 87 and to base bar 173 hold wheel forks 147 against guard stops 119 and pivot assembly 146 from turning. Pivot lock pin 231 is not required. Also wheel forks 147 can remain locked by locking pins 191 in loading position. The pivot lock pin 231 is inserted so pivot assembly 146 and wheel forks 147 will not rotate relative to ram beam member 85. Then in the preferred embodiment and modification with wheel forks 147 in storing or loading positions hook 18 is attached normally to D-ring 229 or to hook eye 108 and winch 20 is used to raise lower boom portion 23, which swings on boom hinge 87, to vertical position next to vertical beam 25. The boom lock 107 is engaged to hold lower boom portion 23 in vertical position, so vehicle lift assembly 12 is locked in storage position for traveling.

In the event that vehicle 208 is positioned so that wrecker truck 10 cannot back substantially straight to it and thus located in substantial alignment with vehicle 208 the above loading procedure is modified as follows. In both the preferred embodiment and modification, after the lower boom portion 23 is lowered to loading position, FIG. 1, and the ram beam member extended if required to provide the required length of lower boom portion 23, as described above.

Pivot lock pin 231 remains removed or is now removed and wheel forks 147 are unfolded or remain unfolded and are locked by locking pins 191 in loading position so the pivot assembly 146 and wheel forks 147, the dual lift assembly 193, is free to pivot on king pin 141 on ram beam member 85 for positioning in line to receive a pair of wheels 207 of vehicle 208. This dual lift assembly 193 may be positioned relative to ram beam member 85 and thus wrecker truck 10 at any rearward angle, a range of approximately 180°. Thus only a small space is required at the end of vehicle 208 for dual lift assembly 193. Then with the dual lift assembly 193 at such angle to wrecker truck 10, the wrecker truck 10 is backed at a similar angle up to substantially 90° or perpendicular to vehicle 208 to position dual lift assembly 193 in such small space for loading. In this way vehicle 208 when parked between other vehicles or obstructions, can be loaded.

Then for loading, wrecker cable 17 or a chain extension thereof is placed in pulley 104, near boom hinge 87, and guide pulley 164, so cable 17 extends over lower boom portion 23 and then at an angle to vehicle 208 and is attached to a suitable part, frame or axle 209, of vehicle 208. A sling chain 233 with its sling chain hook 234 provides a suitable chain extension. Then use winch 20 to reel in cable 17 to pull vehicle 208 which will roll onto the wheel forks 147. When cable 17 is used to pull vehicle 208 positioned at an intermediate angle to wrecker truck 10, dual fork assembly 193 is positioned transverse to cable 17, at a similar angle, so tine bars 176, 177 are aligned with vehicle 208 and guide pulley 164 is mounted by its shafts 165 in bore 170 in king pin 141 so the cable reaction force on guide pulley 164 is transferred to ram beam member 85 and there is no turning moment on dual fork assembly 193. When vehicle 208 and thus dual fork assembly 193 are at the right or left maximum angle position, guide pulley 164 is mounted by its shaft 165 in the vertical bore 227 in the left or right base bar 173, the one of vertical bores 227 nearer wrecker truck 10, so the cable reaction force on guide pulley 164 provides a turning moment to hold dual fork assembly 193 in either maximum angle position. In situations where one or both wheel forks 147 are a little above ground level, support rods 208 may be removed for entry of wheels 207 into wheel forks 147. Then the rods 206 are reinserted in a selected pair of bearing bushings 201 to lift wheels 207. Thereafter the above described procedures for lifting and towing vehicle 208 are followed.

When it is preferred to lift vehicle 208 with sling 148, the lift assembly 12 of either the preferred embodiment or modification is lowered in the manner described above for lowering to fork loading position to a sling loading position with proper ram length for placing bottom sling bar 217 a little above ground level and below the underbody of vehicle 208. Similarly lift boom 21 is supported on support pin 50, ram lock 114 is engaged and pivot lock 231 is disengaged. Each wheel fork 147 remains in storage position or is unlocked by removing locking pins 191 and swung about fork hinge 189 from loading position, FIGS. 1 and 2, to storage position adjacent outer beam member 86 and engaging guard stops 119 as shown in dot-dash lines FIG. 2. Suitable holding means, such as a shock cord or strap (not shown) hold wheel forks 147 in folded storage position.

To use sling 148, the wing nut of stud and wing nut 228 is removed and cable hook 18 is positioned in central shackle 230 on top sling bar 218. The bottom sling bar 217 remains pivotally mounted by sling pivot pin 159 on pivot assembly 146 which may rotate on king pin 141. Then wrecker truck 10 is backed until bottom sling bar 217 is positioned under vehicle 208.

The known sling chains 233 are placed with hooks 234 attached to vehicle 208, e.g. its axle, and attached tautly to hooks 225 at each end of the bottom of sling bar 127, and extending with slack and attached to sling hooks 226 on top sling bar 218.

To raise boom 21, to a height for sufficient road clearance, the above described lifting method employing winch 20 with cable hook 18 in hook eye 108, or hydraulic lifting method employing lift assembly 58 is used. In this process, the bottom sling bar 217 engages the underbody to lift vehicle 208 partially toward towing height. When boom 21 is to desired towing height, support pin 50 is inserted into appropriate aligned support holes 49, then lift boom 21 is lowered to rest on support pin 50 of boom support assembly 40. Then cable hook 18 is placed in shackle 230 on top sling bar 218 to lift sling 148, and vehicle 208 to desired towing height.

On arrival at the destination, winch 20 is used to lower sling 148, and hook 18 is disengaged from shackle 230. Hook 18 is then engaged in hook eye 108 and boom 21 is raised, whereupon support pin 50 is removed from proper support holes 49 and boom 21 is then lowered to the ground. After removing sling chain hooks 234, the wrecker is removed and vehicle lift assembly 12 may be placed in storage position as described above.

In the above description the words vertical, horizontal, upper, lower, transverse, longitudinal, inner, outer, inboard, and outboard, describe the relation of parts in the loading position shown in FIGS. 1 and 2.

In the further modification FIGS. 12 and 13, mounting bracket 60' is modified to provide both guide means for vertical beam 25' like mounting bracket 60 of the preferred embodiment FIG. 1 and mechanical support means like boom support assembly 40 of the preferred embodiment FIG. 1. Thus in this further modification FIGS. 12 and 13, wrecker truck 10, derrick 11 and vehicle lift assembly 12 are the same as in FIG. 1, except that boom support assembly 40 is omitted and mounting bracket 60' and vertical beam 25' are modified as now described. Modified mounting bracket 60' has a pair of angle irons 66' each having a base wall 299 and an angle wall 68'. The base walls 299 are located vertically on opposite sides of vertical beam 25' and secured by bolts or welding to back plate 42. The angle walls 68' are located vertically on opposite sides of vertical beam 25' and are parallel to and engage side walls 56' to guide vertical beam 25' and thus lift boom 21 in a vertical plane in all positions during pivotal movement about the horizontal pivot axis of pivot pin 36 of mounting hinge 27. A reinforcing plate 300 is secured to each angle wall 68'. A pair of holes 301 extend horizontally through both angle walls 68' and reinforcing plates 300. A series of apertures 302 extend horizontally through both side walls 56' and plates 305 between the front wall and rear wall 82 of vertical beam 25'. Each plate 305 is secured to one side wall 56' for reinforcement over the area containing apertures 302 within vertical beam 25'. The vertical beam 25' is otherwise the same as vertical beam 25 FIG. 1. The pair of holes 301, preferably being oversized or slotted to permit unloading of pin 50', and series of apertures 302 are all spaced along the same arc from the horizontal pivot axis of pivot pin 36. The pair of holes 301 are spaced one half the distance, e.g. 1½" centers, of the spacing distance, e.g. 3" centers, of the apertures of series of apertures 302, so this mechanical support means provides almost (one less than) twice the number of adjustable height positions as there are apertures in the series of apertures 302. If more than 2 support holes 301 are used, the spacing or center distance between support holes 301 is equal to the reciprocal of the number of support holes 301 (e.g. ⅓ for 3 support holes) times the equal spacing or center distance between support apertures 302. The support pin 50' is like support pin 50 FIGS. 1, 2 and 3 and is placed on one selected hole of the pair of holes 301 and an aligned aperture of the series of apertures 302 to support vertical beam 25' and lift boom 21 in a series of adjustable height positions. Gussets 303 secured to base wall 299 and angle wall 68' reinforce angle iron 66' which transfers transverse load from vertical beam 25' to wrecker truck 10. The operation of this further modification is the same as the herein described operation of the preferred embodiment of FIGS. 1, 2 and 3 except for the above described placing of support pin 50'.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An improved vehicle towing apparatus for mounting on a wrecker truck for loading, lifting, and towing a vehicle, comprising; boom means having low beam means, with a front end and rear end for supporting a vehicle load, mounting means connected to said boom means for mounting said boom means on a wrecker truck for supporting a vehicle load on a wrecker truck with said low beam means having said front end immediately at the rear of a wrecker truck and extending longitudinally rearward to said rear end, and for movement of said low beam means only in a vertical plane between and supporting said low beam means in a lower loading position substantially at ground level and an upper towing position and preventing lateral and twisting movement and a vehicle lift assembly having right and left vehicle lifts for engaging under opposite side portions of a vehicle and pivot means pivotally mounting said right and left vehicle lefts on said rear end of said low beam means for pivotal movement, only in a transverse plane relative to said low beam means, from a transverse position with said right and left vehicle lifts in transverse alignment and on opposite sides of said low beam means with both said right and left vehicle lifts pivotally moving in the same direction to right or left angular positions to provide load supporting positions for engaging under opposite side portions of a vehicle aligned with or at an angle to a wrecker truck and pivotally movable in opposite directions from a load supporting position to a storage position with said right and left vehicle lifts respectively alongside the right and left sides of said low beam means.

2. The invention defined in claim 1 wherein said pivot means includes a pivot member pivotally mounted on said rear end of said low beam means for pivotal movement about a vertical pivot axis and in said transverse plane and right and left locking hinge means respectively connecting said right and left vehicle lifts to the right and left sides of said pivot member for pivotal movement about a vertical hinge axis located, a distance to the rear of said pivot axis and a distance on each side of the longitudinal central axis of said pivot member with both of said distances being about one half the overall width of said low beam means for pivotal movement of said right and left vehicle lifts to said storage position substantially flatly alongside said low beam means and for rididly connecting said right and left vehicle lifts to said pivot member for common pivotal movement to said load supporting positions through a range of substantially 180°.

3. The invention defined in claim 1 further comprising sling means having a top sling bar, a bottom sling bar and strap means connected between said top and bottom sling bars and sling mounting means for mounting said sling means on said rear end of said low beam means in a storage position closely above said low beam means and between said right and left vehicle lifts for pivotal movement similar to the pivotal of said vehicle lifts to said load supporting positions to avoid interference with the operation of said vehicle lifts for supporting a vehicle and for mounting said bottom sling bar on said rear end of said low beam means both in said storage position and in a loading position for loading a vehicle on said sling means.

4. The invention defined in claim 3 wherein said sling mounting means automatically provides pivotal movement in said sling means in said storage position similar to and in response to said pivotal movement of said vehicle lifts to said loading positions.

5. The invention defined in claim 3 wherein said sling mounting means pivotally mounts said bottom sling bar for pivotal movement about a longitudinal axis relative to said low beam means and said vehicle lifts in said loading supporting positions prevent pivotal movement of said bottom sling bar about said longitudinal axis and in said storage position permit pivotal movement of said bottom sling bar on said longitudinal axis.

6. The invention defined in claim 1 further comprising power means for mounting on a wrecker truck for moving and holding said boom means to position said low beam means in and between said lower loading position and upper towing position and mechanical support means having a fixed support member and an adjustable support member selectively engaging said fixed support member and said boom means in a plurality of adjustable height positions to provide mechanical backup support independent of said power means for said boom means in selected adjustable height positions in and between said lower loading position and said upper towing position.

7. An improved vehicle towing apparatus for mounting on a wrecker truck for loading, lifting, and towing a vehicle, comprising: boom means having low beam means, with a front end and rear end for supporting a vehicle load, mounting means connected to said boom means for mounting said boom means on a wrecker truck for supporting a vehicle load on a wrecker truck with said low beam means having said front end immediately at the rear of a wrecker truck and extending longitudinally rearward to said rear end, and for movement of said low beam means only in a vertical plane between and supporting said low beam means in a lower loading position substantially at ground level and an upper towing position and preventing lateral and twisting movement, a pivot member pivotally mounted on said rear end of said low beam means for pivotal movement from a central position aligned with said low beam means through a wide range of rearward angle positions on both sides of said central position only about a vertical pivot axis and in a horizontal transverse plane relative to said low beam means in said loading position, a pair of wheel forks for supporting an opposed pair of vehicle wheels, a pair of cross bars each fixed at its outboard portion to one of said wheel forks and hinge means selectively rigidly connecting and pivotally connecting for pivotal movement about a vertical hinge axis, the inboard end of each of said cross bars to one of the opposite sides of said pivot member operative when rigidly connected to secure said cross bars in alignment with each other and transverse to said low beam means with said pivot member in said central position to mount said wheel forks transversely on opposite sides of said low beam means for common pivotal movement with said pivot member in said horizontal transverse plane through a central and a wide range of rearward angular load supporting positions and operative when pivotally connected for pivotal movement of said wheel forks from a load supporting position to a storage position alongside said low beam means.

8. The invention defined in claim 7 wherein said cross bars are spaced, rearwardly when said pivot member is in said central position, a distance about one half the overall width of said low beam means from said vertical pivot axis so said wide range of rearward angular load supporting positions of said wheel forks is about 180° and said vertical hinge axes being spaced, laterally when said pivot member is in said central position a distance about one half the overall width of said low beam means on opposite sides of said vertical pivot axis so each of said cross bars and affixed wheel fork can swing to a storage position substantially aligned alongside said low beam means.

9. The invention defined in claim 7 further comprising pivot lock means operative in locked position to prevent pivotal movement of said pivot member on said low boom means and in unlocked position to permit said pivotal movement.

10. The invention defined in claim 7 further comprising a sling having a top sling bar, a bottom sling bar and strap means connected between said top and bottom sling bars, sling mounting means for mounting said bottom sling bar on said pivot member for positioning said sling for loading a vehicle on said sling, support means for supporting said sling in a storage position on said pivot member above said low beam means permitting movement of said wheel forks to said storage position forward of said bottom sling bar for loading a vehicle on said sling and to said loading position for loading a vehicle on said wheel forks.

11. The invention defined in claim 7 further comprising a sling having a top sling bar, a bottom sling bar and strap means connected between said top and bottom sling bars; sling mounting means having sling pivot means on said pivot member for pivotally mounting said bottom sling bar at the rear of said pivot member for pivotal movement about a horizontal axis aligned with said low beam means when said pivot member is in said central position for supporting said sling on said low beam means for supporting a vehicle and sling support means on said pivot member for supporting said top sling bar coacting with said sling pivot means for supporting said sling on said pivot member in a storage position for pivotal movement with said pivot member to permit free pivotal movement of said wheel forks for loading a vehicle.

12. The invention defined in claim 11 wherein said sling support means has a sling support bar secured on top of said pivot member and with said pivot member in central position longitudinally aligned with said low beam means extends longitudinally forward over said low beam means, and detachable securing means for securing said top sling bar to the forward portion of said sling support bar in said sling storage position.

13. The invention defined in claim 7 wherein said boom means also includes high beam means having a first beam extending longitudinally and horizontally from a forward end to a rear end and a second beam with an upper end secured transversely to said first beam at its rear end and extending vertically down to a lower end, said mounting means having a support hinge for mounting said forward end of said first beam for pivotal movement about a transverse horizontal axis, boom hinge means connecting said second beam at said lower end to said low beam means at said front end for pivotal movement of said low beam means relative to said second beam only about a transverse horizontal axis and including hinge abutment means to limit downward swinging movement of said low beam means in said loading and towing positions and substantially perpendicular to said second beam for supporting a vehicle load and permitting upward swinging movement of said low beam means to a storage position substantially parallel to said second beam means, power means for mounting on a wrecker truck, engaging said boom means for lifting said boom means from said loading position to said towing position and mechanical support and guide means for mounting on the rear of a wrecker truck for engaging the rear portion of said high beam means to provide mechanical backup support independent of said power means in a plurality of manually adjustable height positions and to guide said boom means for movement only in said vertical plane.

14. The invention defined in claim 13 wherein said mechanical support and guide means has guide members centrally engaging opposite sides of said second beam.

15. The invention defined in claim 13 wherein said mechanical support and guide means has a pair of plates for mounting on a wrecker truck and centrally engaging the opposite sides on said second beam to guide said boom means for movement in said vertical plane and support means including a plurality of support surfaces positioned to provide a plurality of adjustable height positions and a support member selectively positioned to engage selected pairs of said support surfaces in a plurality of adjustable height positions of said boom means to mechanically support said boom means in and between said lower loading and upper towing positions.

16. The invention defined in claim 13 wherein said mechanical support and guide means has a pair of vertical support members for mounting on a wrecker truck having a series of pairs of adjustable height apertures and a support member selectively inserted in one of said pairs of adjustable height apertures and engaging the rear portion of said first beam to mechanically support said boom means selectively in and between said lower loading and upper towing positions.

17. The invention defined in claim 7 wherein each of said cross bars provides a base bar at each side of said pivot member for each of said wheel forks, each of said wheel forks has an outboard tine secured to the outboard end of its base bar and an inboard tine secured to the inboard portion of its base bar, each of said tines being perpendicular to its base bar and extending rearwardly in horizontal alignment with said low beam means and each wheel fork has a support rod rotatably supported on its inboard and outboard tines to ease movement under a ground supported wheel and in spaced relation to its base bar for cradle supporting a wheel between its support rod and base bar.

18. A vehicle towing apparatus, comprising: a wrecker truck having a frame and a platform mounted on said frame and extending generally horizontally to the rear portion of said wrecker truck; lift boom means including an upper boom having only one horizontal beam with a front end and a rear end and only one vertical beam with the top end rigidly transversely secured to said rear end of said horizontal beam and a bottom end and only one lower boom having a front end and a rear end; vehicle lift means mounted on said rear end of said lower boom; attaching means for attaching said front end of said lower boom on the bottom end of said vertical beam to extend transversely rearward in a load supporting position relative to said vertical beam and preventing lateral and twisting movement; mounting means pivotally mounting said front end of said horizontal beam centrally and forwardly on said platform for pivotal movement of said lift boom means only about a transverse horizontal axis for movement in a vertical plane between a loading position and a towing position and preventing lateral movement out of said vertical plane; power means mounted on said wrecker truck and engaging said lift boom means to move said lift boom means between and support said lift boom means in said loading, towing and intermediate positions; said lift boom means in said position having said horizontal beam extending generally horizontally and longitudinally over said platform, said vertical beam extending downwardly closely adjacent said back plate and said lower boom extending substantially horizontally near ground level all in said vertical plane and pivotally moving on said mounting means with said horizontal beam, vertical beam and lower boom remaining in the same relative position to each other to raise said lift boom means to towing position so said horizontal beam and lower boom slope upwardly and rearwardly in said vertical plane to raise said vehicle lift means and a vehicle thereon for towing and said vehicle lift means having right and left vehicle lifts for engaging under opposite said portions of a vehicle and pivot means pivotally mounting said right and left vehicle lifts on said rear end of said lower boom for pivotal movement, only in a transverse horizontal plane relative to said low beam means, from a transverse position with said right and left vehicle lifts in transverse alignment and on opposite sides of said lower boom with both said right and left vehicle lifts pivotally moving in the same direction to right or left angular positions to provide load supporting positions for engaging under opposite side portions of a vehicle aligned with or at an angle to said wrecker truck and pivotally movable in opposited directions from a load supporting position to a storage position with said right and left vehicle lifts respectively alongside the right and left sides of said lower boom.

19. The invention defined in claim 18 further comprising sling means having a top sling bar, a bottom sling bar and strap means connected between said top and bottom sling bars and sling mounting means for mounting said sling means on said rear end of said lower boom in a storage position closely above said lower boom and between said right and left vehicle lifts for pivotal movement similar to the pivotal of said vehicle lifts to said load supporting positions to avoid interference with the operation of said vehicle lifts for supporting a vehicle and for mounting said bottom sling bar on said rear end of said low beam means both in said storage position and in a loading position for loading a vehicle on said sling means.

20. The invention defined in claim 18 further comprising adjustable mechanical support means has a fixed support member mounted on said rear portion of said wrecker truck and a movable support member supported on said fixed support member and supporting said lift boom means at the longitudinal central portion and being selectively movable to each of a plurality of adjustable height positions for mechanically structurally supporting the load of said lift boom directly on said rear portion of said wrecker truck independent of said power means to unload said power means in the selected one of said loading, towing and intermediate positions.

21. The invention defined in claim 20 wherein said fixed support member includes a pair of strut members, each secured at its lower end to said rear portion of said wrecker truck and extending vertically on opposite sides of the rear portion of said horizontal beam; a series of support holes in each strut member arranged to extend vertically with corresponding height support holes in each strut member being horizontally aligned to provide a series of pairs of support holes and said movable member being a support pin selectively insertable in a selected one of each of said pairs of support holes providing said adjustable height positions for supporting said lift boom means.

22. The invention defined in claim 20 wherein said fixed support member includes a pair of guide plates secured to said rear portion of said wrecker truck and slidably engaging the opposite lateral sides of said vertical beam between said top and bottom ends to further guide said lift boom means in said vertical plane, a series of support apertures extending horizontally through one of said bertical beams and said pair of guide plates, a support portion on the other of said vertical beam and said pair of guide plates, both said series of support apertures and guide portion being located on an arc about said transverse horizontal axis of said mounting means and a support pin insertable in a selected one of said series of support apertures and supported on said support portion to rigidly mechanically support said lift hoom in said loading, towing and intermediate position.

23. The invention defined in claim 22 wherein said support apertures, are on equally spaced centers in said vertical beam and having the same center distance and said support portion is a small number of support holes in each of said guide plates spaced on centers having a center distance equal to the reciprocal of said small number times the center distance of said spaced centers of said support apertures.

24. The invention defined in claim 23 wherein there are two of said support holes spaced on centers spaced one half the center distance of said spaced centers of said support apertures.

25. The invention defined in claim 18 and further composing guide means mounted on said wrecker truck and engaging opposite lateral side walls of said vertical beam in loading, towing and intermediate positions to retain said lift boom in said vertical plane.

26. A vehicle towing apparatus, comprising: a wrecker truck having a frame and a platform extending generally horizontally and a back plate extending generally vertically at the rear of said platform with both mounted on said frame; lift boom means including an upper boom portion having only one horizontal beam with a front end and a rear end and only one vertical beam with the top end rigidly transversely secured to said rear end of said horizontal beam providing a knee portion and a bottom end; only one lower boom having a front end and a rear end; vehicle lift means mounted on said rear end of said lower boom; attaching means for attaching said front end of said lower boom on the bottom end of said vertical beam to extend transversely rearward in a load supporting position relative to said vertical beam and preventing lateral and twisting movement; mounting means pivotally mounting said front end of said horizontal beam centrally and forwardly on said platform for pivotal movement of said lift boom means only about a transverse horizontal axis for movement in a vertical plane between a loading position and a towing position and preventing lateral movement out of said vertical plane; power means mounted on said wrecker truck and engaging said lift boom means to move said lift boom between and support said lift boom means in said loading, towing and intermediate positions; said lift boom means in said loading position having said horizontal beam extending generally horizontally and longitudinally over said platform, said vertical beam extending downwardly closely adjacent said back plate and said lower boom portion extending substantially horizontally near ground level all in said vertical plane and pivotally moving on said mounting means with said horizontal beam, vertical beam and lower boom remaining in the same relative position to each other to raise said lift boom means to towing position so said horizontal beam and lower beam slope upwardly and rearwardly in said vertical plane to raise said vehicle lift means and a vehicle thereon for towing, and said vehicle lift means having a pivot member pivotally mounted on said rear end of said lower boom for pivotal movement from a central position aligned with said lower boom through a wide range of rearward angle positions on both sides of said central position only about a vertical pivot axis and in a horizontal transverse plane relative to said lower boom in said loading position, a pair of wheels forks for supporting an opposed pair of vehicle wheels, a pair of cross bars each fixed at its outboard portion to one of said wheel forks and hinge means selectively rigidly connecting and pivotally connecting for pivotal movement about a vertical hinge axis, the inboard end of each off said cross bars to one of the ooposite sides of said pivot member operative when rigidly connected to secure said cross bars in alignment with each other and transverse to said lower boom with said pivot member in said central position to mount said wheel forks transversely on opposite sides of said lower boom for common pivotal movement with said pivot member in said horizontal transverse plane through a central and a wide range of rearward angular load supporting positions and operative when pivotally connected for pivotal movement of said wheel forks from a load supporting position to a storage position alongside said lower boom.

27. The invention defined in claim 26 wherein said cross bars are spaced, rearwardly when said pivot member is in said central position, a distance about one half the overall width of said lower boom from said vertical pivot axis so said wide range of rearward angular load supporting positions of said wheel forks is abot 180° and said vertical hinge axes being spaced laterally when said pivot member is in said central position a distance about one half the overall width of said lower boom on opposite sides of said vertical pivot axis so each of said cross bars and affixed wheel fork can swing to a storage position substantially aligned alongside said lower boom.

28. The invention defined in claim 27 further comprising a sling having a top sling bar, a bottom sling bar and strap means connected between said top and bottom sling bars; sling mounting means having sling pivot means on said pivot member for pivotally mounting said bottom sling bar at the rear of said pivot member for pivotal movement when said wheel forks are in storage position about a horizontal axis aligned with said lower boom when said pivot member is in said central position and rotating with said pivot member, for supporting said sling on said lower boom for supporting a vehicle on said sling, and sling support means fixed on said pivot member for detachably supporting said top sling bar and coacting with sling pivot means for supporting said sling on; said pivot member horizontally above said lower boom, in a storage position for pivotal movement similar to and in response to pivotal movement of said pivot member to permit free pivotal movement of said pivot member and wheel forks for loading a vehicle on said wheel forks and said wheel forks in loading positions engaging said bottom sling bar to prevent rotation on said sling pivot means and in storage position disengaged from said bottom sling bar to permit rotation on said sling pivot means.

29. The invention defined in claim 28 further comprising adjustable mechanical support means has a fixed support member mounted on the rear portion of said wrecker truck and a movable support member supported on said fixed support member and supporting said lift boom means at the longitudinal central portion and being selectively movable to each of a plurality of adjustable height positions for mechanically structurally supporting the load of said lift boom directly on said rear portion of said wrecker truck independent of said power means to unload said power means in the selected one of said loading, towing and intermediate positions.

30. The invention defined in claim 29 wherein said fixed support member includes a pair of strut members, each secured at its lower end to the rear portion of said platform and extending vertically on opposite sides of the rear portion of said horizontal beam; a series of support holes in each strut member arranged to extend vertically with corresponding height support holes in each strut member being horizontally aligned to provide a series of pairs of support holes and said movable member being a support pin selectively insertable in a selected one of each of said pairs of support holes providing said adjustable height positions for supporting said lift boom means.

31. The invention defined in claim 29 wherein said fixed support member includes a pair of guide plates secured to said back plate and slidably engaging the opposite lateral sides of said vertical beam centrally between said top and bottom ends to further guide said lift boom means in said vertical plane, a series of support apertures extending horizontally through one of said vertical beams and said pair of guide plates, a support portion on the other of said vertical beam and said pair of guide plates, both said series of support apertures and guide portion being located on an arc about said transverse horizontal axis of said mounting means and a support pin insertable in a selected one of said series of support apertures and supported on said support portion to rigidly mechanically support said lift boom in said loading, towing and intermediate position.

32. The invention defined in claim 26 wherein said power means includes a derrick mounted on said wrecker truck and having a cable and a power winch for raising and lowering said cable; said attaching means providing swinging movement of said lower booms from said load supporting position to a storage position alongside said vertical beam; said lower beam having a first member attached by said attaching means to said vertical beam, a second number telescopically mounted on said first member and pivotally mounting said pivot member for extending and retracting said lower boom and locking means to lock said first and second members in external positions; first securing means to secure said cable to said second member to raise said lower boom to storage position and to extend and retract said lower beam and second securing means to secure said cable to said first member to move said lift boom means between loading and towing positions.

33. The invention defined in claim 30 wherein said power means includes hydraulic cylinder means mounted on said back plate and extending vertically to engage said knee portion of said lift boom means to raise and lower said lift boom means.

34. A vehicle towing apparatus, comprising: a wrecker truck having a frame and a platform extending generally horizontally and a back plate extending generally vertically at the rear of said platform with both mounted on said frame; a lift boom including an upper boom portion having only one horizontal beam with a front end and a rear end and only one vertical beam with the top end rigidly transversely secured to said rear end of said horizontal beam and a bottom end; only one lower boom portion having a front end and a rear end; vehicle supporting means mounted on said rear end of said lower boom portion; attaching means for attaching said front end of said lower boom portion on the bottom end of said vertical beam to extend transversely rearward in a load supporting position relative to said vertical beam and preventing lateral and twisting movement; mounting means pivotally mounting said front end of said horizontal beam centrally and forwardly on said platform for pivotal movement of said lift boom only about a transverse horizontal axis for movement in a vertical plane between a loading position and a towing position and preventing lateral movement out of said vertical plane; power means mounted on said wrecker truck and engaging said lift boom to move said lift boom between and support said lift boom in said loading, towing and intermediate positions; said lift boom in said loading position having said horizontal beam extending generally horizontally and longitudinally over said platform, said vertical beam extending downwardly closely adjacent said back plate and said lower boom portion extending substantially horizontally near ground level all in said vertical plane and pivotally moving on said mounting means with said horizontal beam, vertical beam and lower boom portion remaining in the same relative position to each other to raise said lift boom to towing position so said horizontal beam and lower boom portion slope upwardly and rearwardly in said vertical plane to raise said vehicle supporting means and a vehicle thereon for towing and adjustable mechanical support means mounted on the rear portion of said wrecker truck and engaging the longitudinal central portion of said lift boom and having a plurality of adjustable height positions for mechanically structurally supporting the load of said lift boom directly on said rear portion of said wrecker truck independently of said power means to unload said power means in the selected one of said loading, towing and intermediate positions.

35. A vehicle towing apparatus, comprising: a wrecker truck having a frame and platform extending generally horizontally and a back plate extending generally vertically at the rear of said platform with both mounted on said frame; a lift boom including an upper boom portion having only one horizontal beam with a front end and a rear end and only one vertical beam with the top end rigidly transversely secured to said rear end of said horizontal beam and a bottom end; only one lower boom portion having a front end and a rear end; vehicle supporting means mounted on said rear end of said lower boom portion; attaching means for attaching said front end of said lower boom portion on the bottom end of said vertical beam to extend transversely rearward in a load supporting position relative to said vertical beam and preventing lateral and twisting movement; mounting means pivotally mounting said front end of said horizontal beam centrally and forwardly on said platform for pivotal movement of said lift boom only about a transverse horizontal axis for movement in a vertical plane between a loading position and a towing position and preventing lateral movement out of said vertical plane; power means mounted on said wrecker truck and engaging said lift boom to move said lift boom between and support said lift boom in said loading, towing and intermediate positions; said lift boom in said loading position having said horizontal beam extending generally horizontally and longitudinally over said platform, said vertical beam extending downwardly closely adjacent said back plate and said lower boom portion extending substantially horizontally near ground level all in said vertical plane and pivotally moving on said mounting means with said horizontal beam, vertical beam and lower boom portion remaining in the same relative position to each other to raise said lift boom to towing position so said horizontal beam and lower boom portion slope upwardly and rearwardly in said vertical plane to raise said vehicle supporting means and a vehicle thereon for towing and guide means mounted on said wrecker truck and located adjacent to and at the rear end of said platform, said guide means having a pair of guide members slidably engaging opposite lateral sides of said vertical beam in a central portion in said loading position of said lift boom and a lower portion in said towing position of said lift boom to further retain said lift boom in said vertical plane.

* * * * *